(12) United States Patent
Braun et al.

(10) Patent No.: US 10,728,587 B2
(45) Date of Patent: Jul. 28, 2020

(54) VEHICLE ENTERTAINMENT SYSTEM

(71) Applicant: Panasonic Avionics Corporation, Lake Forest, CA (US)

(72) Inventors: Peter Braun, Foothill Ranch, CA (US); Philip Watson, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 16/003,995

(22) Filed: Jun. 8, 2018

(65) Prior Publication Data
US 2019/0379918 A1    Dec. 12, 2019

(51) Int. Cl.
*H04N 21/214* (2011.01)
*H04N 21/414* (2011.01)
*H04N 21/238* (2011.01)
*H04N 21/24* (2011.01)
*H04N 21/231* (2011.01)
(Continued)

(52) U.S. Cl.
CPC ..... *H04N 21/23109* (2013.01); *H04N 21/214* (2013.01); *H04N 21/2146* (2013.01); *H04N 21/238* (2013.01); *H04N 21/2393* (2013.01); *H04N 21/2407* (2013.01); *H04N 21/41422* (2013.01); *H04N 21/2402* (2013.01); *H04N 21/26216* (2013.01)

(58) Field of Classification Search
CPC ............. H04N 21/214; H04N 21/2146; H04N 21/41422; H04N 21/238; H04N 21/24; H04N 21/2402; H04N 21/26216
See application file for complete search history.

(56) References Cited

U.S. PATENT DOCUMENTS 5,208,665 A    5/1993    McCalley et al.
5,404,567 A    4/1995    DePietro et al.
5,973,722 A    10/1999    Wakai et al.
(Continued)

FOREIGN PATENT DOCUMENTS

WO    WO2008/029053    3/2008

OTHER PUBLICATIONS

Office Action from USPTO dated Feb. 7, 2018 for U.S. Appl. No. 15/145,604.
(Continued)

*Primary Examiner* — Pinkal R Chokshi
(74) *Attorney, Agent, or Firm* — Klein, O'Neill & Singh, LLP

(57) ABSTRACT

Methods and systems for a vehicle entertainment system are provided. One method includes generating by a processor, a plurality of media sets for storing a plurality of media files at a transportation vehicle, each of the plurality of media set configured to store a first set of media files playable at the same time by all passengers, a second set of media files playable at the same time by up to X percentage of the passengers and a third set of media files playable at the same time by up to Y percentage of the passengers; distributing by the processor, the plurality of media files for storage across a plurality of smart monitors of the transportation vehicle; monitoring user access of the plurality of media files on the transportation vehicle; and modifying by the processor, an assignment of a media file between the first set, the second set and the third set based on a plurality of factors.

20 Claims, 15 Drawing Sheets

(51) Int. Cl.
*H04N 21/239* (2011.01)
*H04N 21/262* (2011.01)

(56) References Cited

U.S. PATENT DOCUMENTS

| | | | |
|---|---|---|---|
| 6,061,720 A | 5/2000 | Karmel et al. | |
| 6,192,416 B1 | 2/2001 | Baxter | |
| 7,103,324 B2 | 9/2006 | Sanford et al. | |
| 7,404,201 B2 | 7/2008 | Takeuchi et al. | |
| 7,620,364 B2 | 11/2009 | Higashida et al. | |
| 7,984,190 B2 | 7/2011 | Rhoads | |
| 8,171,337 B2 | 5/2012 | Peters et al. | |
| 8,283,801 B2 | 10/2012 | Petipierre | |
| 8,442,989 B2 | 5/2013 | Massoulie et al. | |
| 8,667,544 B2 | 3/2014 | Bird et al. | |
| 8,689,264 B2 | 4/2014 | Petrisor | |
| 9,043,846 B2 | 5/2015 | Cline et al. | |
| 9,210,450 B2 | 12/2015 | Healy et al. | |
| 9,226,000 B1* | 12/2015 | Knight | H04N 21/2146 |
| 9,313,527 B2 | 4/2016 | Couleaud et al. | |
| 9,571,863 B2 | 2/2017 | Healy et al. | |
| 10,390,053 B2* | 8/2019 | Boussemart | H04W 84/12 |
| 2005/0256616 A1 | 11/2005 | Rhoads | |
| 2006/0143662 A1* | 6/2006 | Easterling | H04N 5/50 |
| | | | 725/76 |
| 2006/0206565 A1 | 9/2006 | Ganesan et al. | |
| 2006/0271970 A1 | 11/2006 | Mitchell et al. | |
| 2009/0024754 A1 | 1/2009 | Setton et al. | |
| 2009/0034540 A1 | 2/2009 | Law | |
| 2009/0138920 A1* | 5/2009 | Anandpura | G06F 3/147 |
| | | | 725/76 |
| 2011/0219409 A1 | 9/2011 | Frisco et al. | |
| 2012/0167148 A1 | 6/2012 | Healy et al. | |
| 2012/0210372 A1* | 8/2012 | Kaufmann | B64C 1/20 |
| | | | 725/77 |
| 2013/0055321 A1 | 2/2013 | Cline et al. | |
| 2013/0067330 A1* | 3/2013 | Naik | B61L 15/0072 |
| | | | 715/716 |
| 2014/0032660 A1 | 1/2014 | Nguyen | |
| 2015/0046646 A1 | 2/2015 | Elzind | |
| 2015/0245109 A1* | 8/2015 | Couleaud | H04N 21/2146 |
| | | | 725/77 |
| 2016/0248831 A1* | 8/2016 | Watson | G06F 16/44 |
| 2017/0048558 A1 | 2/2017 | Koupsin et al. | |
| 2018/0220196 A1* | 8/2018 | Slater | H04N 21/23605 |

OTHER PUBLICATIONS

Final Office Action from USPTO dated May 7, 2018 for U.S. Appl. No. 15/145,604.
Loureiro, Renzo Z. & Anzaloni, Alessandro, "Searching Content on Peer-to-Peer Networks for In-Flight Entertainment", Aerospace Conference, 2011 IEEE, Mar. 5-12, 2011.
Notice of Allowance from USPTO dated Jul. 6, 2018 for U.S. Appl. No. 15/145,604.
Office Action from Patent Office of the Russian Federation dated Feb. 20, 2019 for Russian Application No. 2015125533.
Office Action from China National Intellectual Property Administration dated Apr. 2, 2019 for Chinese Application No. 201510359186.4.
Office Action from USPTO dated Jul. 11, 2019 for U.S. Appl. No. 16/125,146.
Final Office Action from USPTO dated Oct. 16, 2019 for U.S. Appl. No. 16/125,146.
Office Action from USPTO dated Dec. 3, 2019 for U.S. Appl. No. 16/150,143.
Notice of Allowance from USPTO dated Feb. 5, 2020 for U.S. Appl. No. 16/125,146.
Final Office Action from USPTO dated Apr. 13, 2020 for U.S. Appl. No. 16/150,143.

* cited by examiner

VEHICLE ENTERTAINMENT SYSTEM

TECHNICAL FIELD

The present disclosure relates generally to vehicular entertainment systems, and in particular to virtual local storage (VLS) of an in-flight entertainment system.

BACKGROUND

Entertainment systems for vehicles used in commercial passenger transport are frequently server-based. Specifically, a server stores content, e.g., media files, and provides the content via a network upon demand from client devices operated by users or passengers on the vehicle. Most often, the content is in the form of video and audio files of a media library, which are streamed to the client devices over the network. Accordingly, in conventional systems, the server is central to the operation of the entertainment system. For this reason, server-based systems in the in-flight entertainment field (IFE) are sometimes referred to as server-centric, or centralized AVOD Server System. A disadvantage of server centric systems is that if the server becomes inaccessible, the content stored on the server likewise becomes inaccessible for passengers or users of the client devices. Another disadvantage is the cost of a media server can be prohibitive.

Other types of IFE systems store content in client devices. In particular, IFE systems typically have client devices mounted at each seat for use by passengers. These systems are sometimes referred to in the IFE field as seat-centric, or distributed AVOD Server System. Seat-centric systems have an advantage in that they are not reliant on a server. However, client devices have limited storage capacity for storing content. Therefore, there is a need for increasing a media library size by configuring storage media of client devices without having to increase storage capacity or processor capability of the client devices.

SUMMARY

In one aspect methods and systems for a vehicle entertainment system are provided. One method includes generating by a processor, a plurality of media sets for a media library to store a plurality of media files on a transportation vehicle, each of the plurality of media set configured to store a first set of media files in which each media file of the first set is playable at the same by all passengers, a second set of media files in which each media file of the second set is playable at the same time by up to X percentage of the passengers and a third set of media files in which each media of the third set is playable at the same time by up to Y percentage of the passengers; distributing by the processor, the plurality of media files for storage across a plurality of smart monitors of the transportation vehicle; monitoring user access of the plurality of media files on the transportation vehicle; and modifying by the processor, an assignment of a media file between the first set, the second set and the third set based on a plurality of factors.

In another aspect, a method is provided for use on an aircraft or other types of vehicles for commercial mass passenger transport. The method includes assigning a first portion of a media library having a plurality of media files for an inflight entertainment system of an aircraft to a first set of media files in which each media file of the set is playable at the same by all passengers of the transportation vehicle, and a second portion to a second set of media files in which each media file of the second set is playable at the same time by up to X percentage of the passengers; and storing the plurality of media files for storage across a plurality of smart monitors of the aircraft using a plurality of media sets, each media set having a plurality of media subsets. The plurality of media files are streamed from the plurality of smart monitors in response to user requests. The method further includes monitoring access to the plurality of media files based on user requests; and modifying an assignment of a media file between the first set and the second set based on a plurality of factors including at least two of an access pattern of the media file, aircraft route information, airline preference, aircraft type and configuration, a third party rating of the media file, time of the year and an airline preference.

This brief summary has been provided so that the nature of the disclosure may be understood quickly. A more complete understanding of the disclosure can be obtained by reference to the following detailed description of the various aspects thereof concerning the attached drawings.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a computing device and the computing device itself can be a component. One or more components may reside within a process and/or thread of execution, and a component may be localized on one computing device and/or distributed between two or more computing devices. Also, these components can execute from various computer readable media having various data structures stored thereon. The components may communicate via local and/or remote processes such as in accordance with a signal having one or more data packets (e.g., data from one component interacting with another component in a local system, distributed system, and/or across a computing network with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Described in the following paragraphs are various aspects of the present disclosure. The various aspects are implemented via a combination of hardware and software that include computing or information processing equipment having one or more processors configured to execute program logic or software stored on computer readable tangible, non-transitory storage media, e.g., magnetic memory discs, RAM, ROM, flash memory or solid state drives (SSDs). The program logic preferably configures the information processing equipment to provide the functionality as described herein.

Figure 1A:
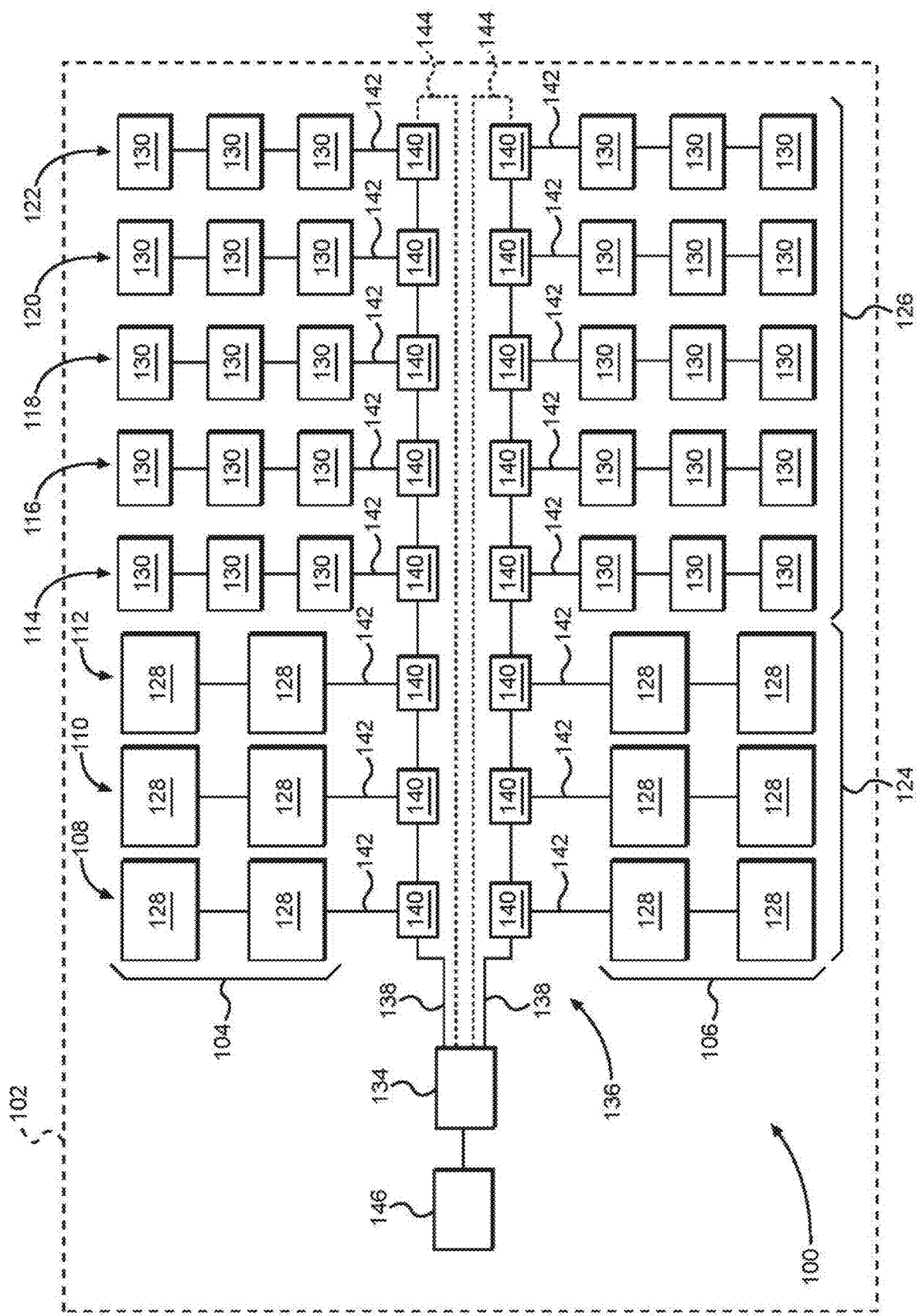
FIG. 1A is a schematic diagram of a vehicle entertainment system of a transportation vehicle, according to one aspect of the present disclosure.

System 100:

FIG. 1A schematically illustrates a vehicle entertainment system 100 disposed in a vehicle 102. The type of vehicle 102 is not limited and may be any kind of vehicle for carrying passengers, for example, an aircraft, bus, train, boat, submarine or spaceship. In this example, the vehicle 102 includes two seat columns 104 and 106 arranged symmetrically from one another across an aisle as typical in vehicles used for passenger transport. Each column 104 and 106 includes seat rows 108 through 122 extending generally orthogonally away from the aisle between the columns. It should be appreciated that FIG. 1A is a schematic drawing for explanatory purposes and passenger transport vehicles, such as aircraft used for commercial passenger transport, which can have hundreds of seats and consequently many more columns and rows than that illustrated in FIG. 1A.

The seat rows 108 through 122 may have different number of seats depending on the class of seating of 122 and 124. For example, seat rows 108 through 112 nearer the front of the vehicle 102 may be premium class seating 122, such as business or first class and have larger seats 128 and/or more spacing between the seats 128. Seat rows 114 through 122 further back in the vehicle 102 may be economy class 126 and have smaller seats 130 and/or less spacing between the seats. Often a bulkhead, not shown, separates one class of seating 124 and 126 from another.

Figure 1B:
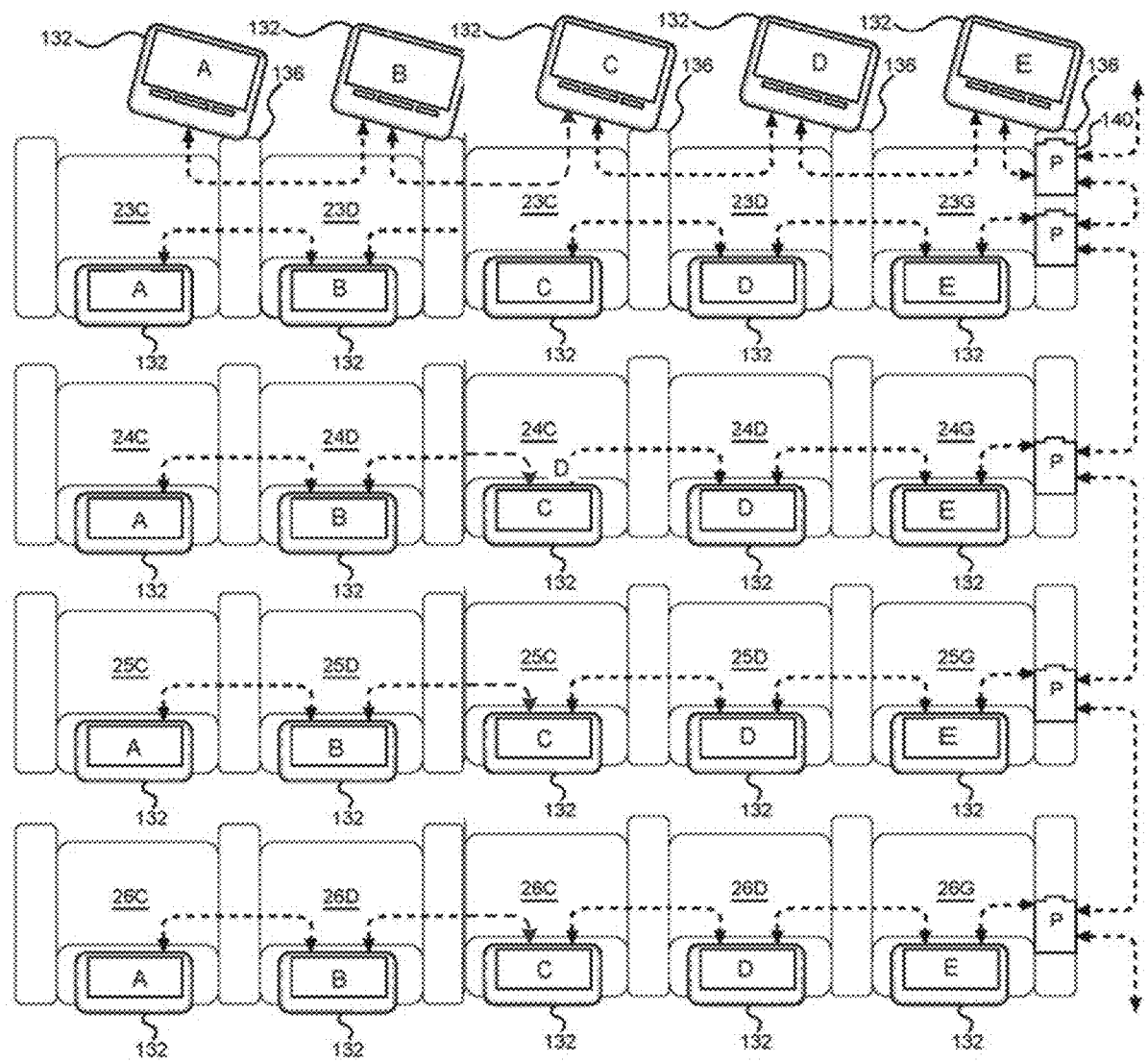
FIG. 1B illustrates a portion of an economy class section of a vehicle entertainment system.

FIG. 1B schematically illustrates a portion or a vehicle having rows of seats. As shown in FIG. 1B, the entertainment system for this vehicle includes smart monitors 132 (SMs), sometimes also called media players, video monitors, video display units or seat devices (for clarity of explanation the smart monitors 132 are not shown in FIG. 1A). Typically, a smart monitor 132 is mounted to the back of each seat for viewing by a passenger or user in the seat immediately behind the seat to which the smart monitor 132 is mounted. For a seat for which there is no seat forward thereof, the smart monitor 132 is frequently mounted to a bulk head in front of the seat. Alternatively, such a smart monitor 132 mounts to a seat arm 136 and is retractable into the seat arm when not in use. The adaptive aspects of the present disclosure are not limited to any specific location/position of the smart monitors 132

The hardware for the smart monitors 132 is preferably of conventional design for use on transportation vehicles. For example, smart monitors sold by Panasonic Avionics Corporation of Lake Forest, Calif., may be used. Smart monitors of other types and from other manufacturers may be used as well. The adaptive aspects disclosed herein are not limited to any particular smart monitor type. The smart monitors 132 as described herein include software or program logic to perform as described in connection with the flow charts shown in FIGS. 3-5. The smart monitors 132 are configured with software or program logic to present media selections to passengers or users, corresponding to media files that are stored at the smart monitors 132 using one or more virtual local storage (VLS) media sets or subsets. In addition, the smart monitors 132 stream one or more files therefrom to another smart monitor via a request communicated over a network.

Each smart monitor 132 can only hold a subset of the total media library of the vehicle. For example, as indicated in FIG. 1B, the smart monitors 132 for passengers/users in row 23 are loaded with media subset A. Since these smart monitors are in the first row, these are smart monitors 132 that mount to a seat arm 136. Media subset B is loaded into the smart monitors 132 for the users/passengers in row 24. These are the smart monitors 132 mounted to the back of the seats in row 23. The smart monitors 132 for the users/passengers in row 25 are loaded with media subset C, and so on. In total, five media subsets A, B, C, D and E are illustrated in FIG. 1B as an illustrative non-limiting example. The media subsets A, B, C, D and E are part of a VLS set that is described below in more detail.

As an example, the media files are initially loaded into the server 134 or other server of the vehicle, using conventional techniques. Usually, this is performed by transferring the media from a portable or onboard media loader having the media stored thereon in non-volatile memory, such as an SSD, and copying the media onto the server 134 via a wired Ethernet connection through a media load port on the server. Wired compared to wireless connections currently provide the fastest loading times. Alternatively, the media may be transferred via a wireless connection, such as a satellite connection, ground station-to-vehicle, BLUETOOTH, cellular, or Wi-Fi.

Media is thereafter distributed from the server to the cabin seat network and loaded on to the smart monitors 132 in multiple, parallel multicast streams using Internet Group Multicast Protocol (IGMP) to load each media subset to the smart monitors 132. Generally, each smart monitor 132 in a row will have a different media subset. In an alternative configuration, each media subset may be identical in each smart monitor 132 of a seat sub-network or LAN, i.e., all of the smart monitors 132 for the seats in row 23 have media subset A. This is so that the seat box 140 for the row 23 can load all of the same media files to the smart monitors 132 connected thereto. Using multicast streams minimizes the load time as multiple SMs take in the same (VLS) Media Subset. For a LINUX system, multiple Network Block Device channels are formed that operate simultaneously to transfer the media files from the sever 134 to the smart monitors 132.

It is noteworthy that in one aspect, the media files load into a head-end sever first, such as server 134 in FIG. 1A. A portable media loader or onboard media loader in this aspect would incorporate a portable server for transferring media files to the head-end server 134, but would not typically remain with the vehicle after the media files or content has been transferred. The adaptive aspects of the present disclosure are not limited to first loading server 134 and then smart monitors 132.

Returning to FIG. 1A, in one aspect, system 100 includes one or more servers 134 for managing overall operations of the entertainment system. The server 134 is of conventional hardware design and commercially available, for example, from Panasonic Avionics Corporation of Lake Forest, Calif. Servers from other manufactures may be used as well. FIG. 1A illustrates an aspect having a single server 134, but other aspects may have multiple servers 134. The servers 134 preferably use the LINUX operating system but other operating systems could be used as well, such as WINDOWS (without derogation of any third-party trademark rights). When LINUX or ANDROID (for smart monitors 132) is used, a Network Block Device is used to make remote servers on the network appear as virtual drives for devices, e.g., a smart monitor 132, searching for files stored thereon.

The server 134 preferably includes at least one solid-state drive (SSD) (or any other type of storage media) and one or more high performance processors to enable the server to communicate with the smart monitors 132 and other devices of the transportation vehicle. An SSD enables media files to be rapidly loaded or copied from various wired or wireless loaders onto the server 134. The media files are updated periodically on the server 134, usually monthly or weekly, as newer content becomes available. Each server 134 is normally capable of storing between several terabytes of data in total, such as servers available from Panasonic Avionics Corporation of Lake Forest, Calif., under the NEXT trademark. The various aspects disclosed herein are not limited to any specific server storage capacity.

A network 136 connects the smart monitors 132 and server 134 in communication with another. The network 136 is preferably a conventional local area network (LAN) using Ethernet for communication between the smart monitors 132 and server 134. The network includes higher speed sub-networks 138 extending from the server 134 along the columns 104 and 106. Preferably, the higher speed sub-networks 138 provide throughput of at least gigabyte Ethernet using conventional 2.5GBase-T, 1000BASE-T, Copper-Gigabit wiring/cabling, or CAT5e. The higher speed sub-networks 138 are referred to hereinafter as column sub-networks 138.

The column sub-networks 138 connect to seat boxes 140 that include a switch. A lower speed data sub-network 142 may extend from each seat box 140 and extends along the nearest row of seats thereto (seat rows 108, 110, 112, 114,116,118, 120, or 122). The lower speed sub-networks 142 may each provide at least 100 mbits/s of throughput via conventional Fast Ethernet connections using 100BASE-TX wiring. The lower speed sub-networks 142 form seat LANs or seat sub-networks of at least two smart monitors 132, as opposed to the earlier described column sub-networks 138. The various adaptive aspects described herein are not limited to any particular network protocol or network operating speed.

In one aspect, the seat boxes 140 supply both network connections and power to the smart monitors 132 connecting thereto. Each seat box 140 includes a processor and memory, in which the processor executes software or program logic. The seat boxes may be of conventional hardware and are frequently referred to in the in-flight entertainment field as Power-Network Boxes (PNBs) as the seat boxes 140 provide both power and network connections. Alternatively, the seat boxes 140 may be referred to as Seat Interface Boxes (SIBs). If larger smart monitors are used, such as smart monitors sold under the trademarks of NEXT, ELITE SERIES V2, and ALTUS by Panasonic Avionics Corporation, the seat boxes 140 may provide network connections only, with power provided separately via seat electrical boxes (SEBs) or seat power modules (SPMs). Power Network Boxes, Seat Interface Boxes, Seat Electrical Boxes and Seat Power Modules are all available from Panasonic Avionics Corporation. The term seat box as used herein includes switches that provide both power and network connections for the smart monitors 132 and switches that provide only network connections.

Optionally, the network 138 may include a redundant communication connection or connections 144 for use in the event of a communication path failure. In this regard, a pathway failure along either column sub-network 138 would cut communications between the server 134 and smart monitors 132 in that column 104 or 106 for seats 128 and 130 downstream of the failure. Therefore, a redundant communication connection 144 may extend between the last seat box 140 in each column 104 and 106 and the server 134. The redundant communication connection 144 provides an alternative communication path in the event of a failure in a column sub-network 138 to prevent smart monitors 132 from being cut off from communication with the server 134.

In one aspect, the redundant communication connections 144 provide full communication redundancy and provide gigabyte Ethernet using conventional 2.5GBase-T, 1000BASE-T or Copper-Gigabit wiring/cabling. For cost reduction, the redundant communication connections 144 may be lower data rate connections and reserved only for public announcements and map data from the server 134. In this regard, the entertainment system 100 includes an interface or crew terminal 146 for use by vehicle personnel to control the entertainment system 100 and communicate public announcements to the smart monitors 132. Redundant communication connections 144 provide for an alternative way to broadcast public announcements to the smart monitors 132 in the event of a communication failure.

In one aspect, instead of wired connections, smart monitors 132 could wirelessly connect over a network either directly with one another or indirectly via a wireless access point. The communication standard could be according to the 802 family (Wi-Fi), BLUETOOTH standard, or other communication standards. If a wireless access point is provided, it could have local content storage and act as another source of media files should a connectivity failure occur. Streaming could provide different quality of service depending on the source, for example, lower speed connections, such as a wireless connection, providing lower quality of service.

Figure 2A:
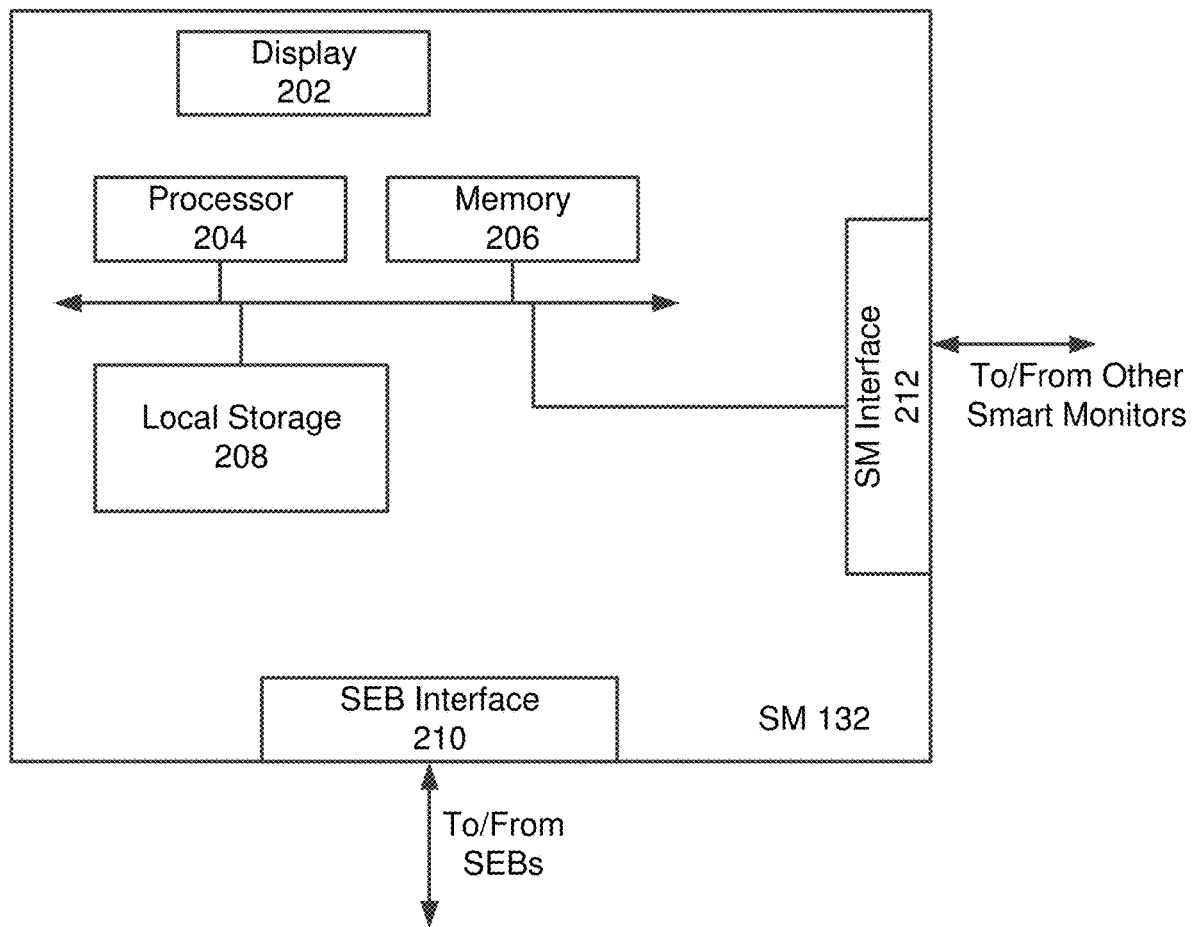
FIG. 2A shows an example of a smart monitor, used according to one aspect of the present disclosure.

Smart Monitor 132:

FIG. 2A shows a block diagram of a smart monitor 132 for using VLS, according to one aspect of the present disclosure. Smart monitor 132 includes a display screen 202 to display content. Smart monitor 132 includes one or more processors 204 with access to a memory 206. Processor 204 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 206 represents any form of random access memory (RAM), read-only memory (ROM), flash memory, or the like, or a combination of such devices.

Memory 206 includes executable instructions for managing the overall operations of the smart monitor 206. In one aspect, processor 204 executes an operating system based on ANDROID out of memory 206. However, other operating systems could be used, such as LINUX or proprietary operating systems available from Microsoft Corporation of Redmond, Wash. or Apple Inc. of Cupertino, Calif., which respectively sell operating systems under the trademarks of WINDOWS and IOS (without derogation of any trademark rights).

Figure 2B:
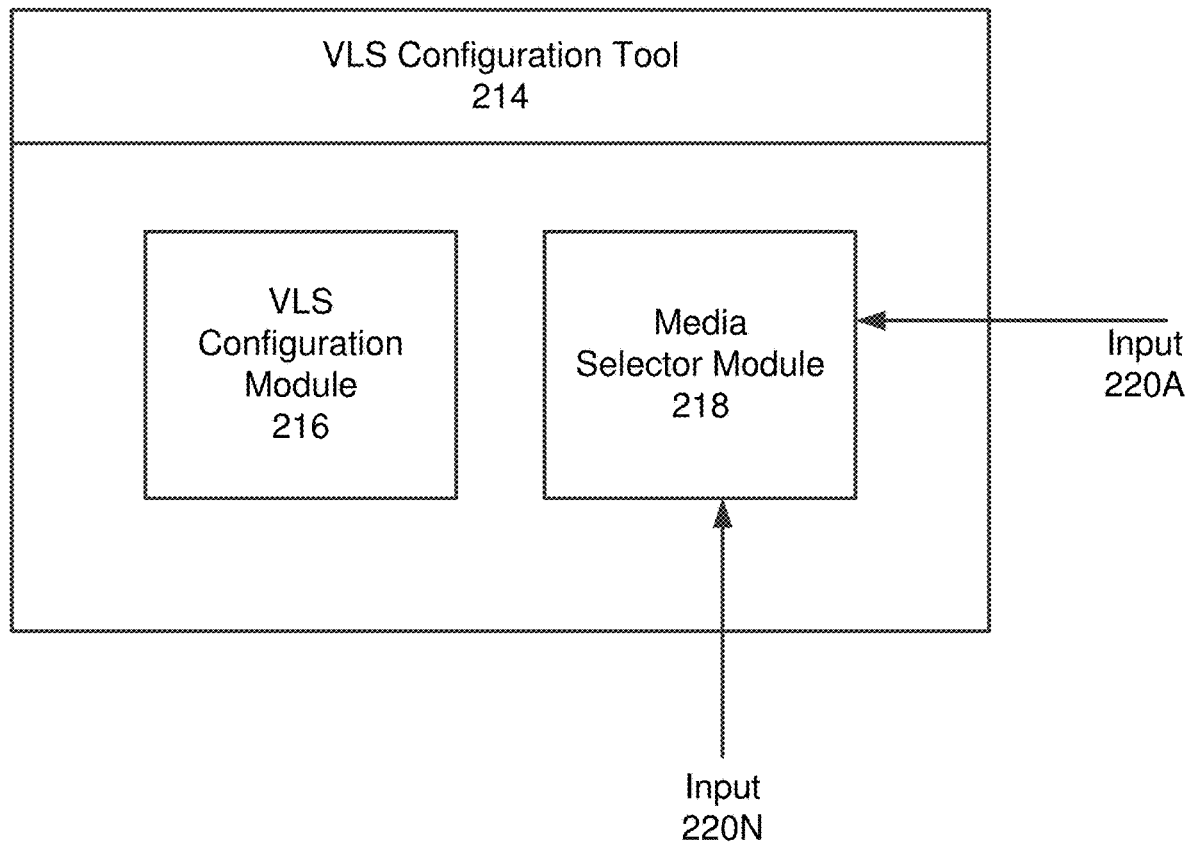
FIG. 2B shows an example of a virtual local storage (VLS) configuration tool, according to one aspect of the present disclosure.

In one aspect, program logic executed by processor 204 out of memory 206 tracks a name of a media file that is accessed by a user, how often it is accessed during a flight/journey, a date and time the media file is accessed and whether the passenger belongs to a premium class or non-premium class. This information is stored in a data structure that is provided to a media selector module 218, described below with respect to FIG. 2B.

Smart monitor 132 includes a smart monitor interface 212 that enables communication with other smart monitors. In one aspect, interface 212 includes logic and circuit to support inter-smart monitor communication, i.e., communication from one smart monitor to another. The communication may use a wired network connection or wireless connection. The smart monitor communication is not limited to any specific network communication type, network protocol or operating speed.

When connected to a seat box 140, smart monitor 132 includes a seat electronic box (SEB) interface 210 with logic and circuitry to communicate with seat box 140. The connection with seat box 140 may be wired or wireless.

The smart monitor 132 also includes a local storage device 208, e.g. a non-volatile memory device for storing media files, such as a memory card according to the Secure Digital standard, i.e., an SD flash memory card. In particular, ECO smart monitors currently available from Panasonic Avionics Corporation (without derogation of any trademark rights) have SD cards according to the eXtended-Capacity standard, i.e., SDXC flash memory cards.

A media library having a plurality of media files is used to present media content at the transportation vehicle. The number of media files stored by the smart monitor 132 is based on the storage capacity of the storage device 208 and the size of the media file (note: the media file size depends on the movie resolution (e.g. 1080p vs. 4k) and the type of encoding). The number of media files in the media library is based on the storage capacity of the storage device 208 and the number of AVOD streams a SM can provide to other SMs, referred to as the VLS factor (VLSF). The VLSF factor depends on the processing capability of processor 204 and the available network bandwidth of the cabin seat network 138. For example, the VSLF is affected by the number of streams that a smart monitor can stream to other smart monitors with acceptable quality, while playing a video stream with acceptable quality for the passenger currently using the smart monitor and perform other functions for the passenger. In one aspect, the VLS media library size for the transportation vehicle is based on: storage capacity of the smart monitor*VLSF. For example, if the VLSF is 15 and the storage capacity is 200 GB (gigabytes), then the total VLS capacity to store media files is 15*200=3 TB (terabytes). If an average media file (for example, a movie) is 5 GB, then the VLS can only accommodate a total of 600 movies. In this model, any of the 600 movies can be watched by all passengers at the same time (i.e. 100% AVOD coverage). The adaptive aspects of the present disclosure expand the media library size (i.e. the number of different media files) by categorizing media files into one of three (3) different AVOD coverage models, or categories (i.e. 100%, 50% and 25% AVOD coverage), as described below in detail.

VLS Configuration Tool 214:

In one aspect, computing technology is provided to configure VLS for the transportation vehicle and expand media library size, providing more options for more titles being available for passenger selection. The computing technology may be implemented as a processor executable VLS configuration tool 214 shown in FIG. 2B. The VLS configuration tool 214 includes a VLS configuration module 216 and a media selector module (may also be referred to as "media selector") 218. The media selector 218 receives a plurality of inputs 220A-220N, based on which media files can be assigned/re-assigned a particular category, as described below in detail with respect to FIG. 2C.

A VLS configuration tool 214 may be operated onboard a vehicle and also off board, such as at a media file processing center. Operation of the VLS configuration tool 214 off board the vehicle, i.e., as a ground tool, provides advantages in that usage data from all vehicles in a fleet may be received and processed to determine the category to which a media file is assigned, e.g., 100%, 50% or 25%. In general, usage data for media from all vehicles in a fleet is more valuable than data from an individual vehicle. Hence, for a VLS configuration 214 used off board a vehicle, the inputs 220A through 220N to the tool 214, come from each vehicle in the fleet operated by the transportation carrier.

VLS Media Sets 222A-222D:

In one aspect, a media library on a transportation vehicle includes a plurality of media files, for example, movies, audio files and others. The product of the number of files and size of the files determines the overall size of the VLS media library.

In one aspect of the present disclosure, the media library size is increased by grouping media files (for example, movies) into three (3) different categories or media tiers. The categories are indicative of a likelihood that a particular media file will be accessed more or less frequently by a certain number of passengers. In one aspect, media files for a transportation vehicle may be categorized into a plurality of tiers, X1, X2, X3, e.g. 100%, 50% and 25%. The 100% tier indicates that any media file within this category is guaranteed to be viewable/playable by all onboard passengers at the same time.

The 50% tier indicates that any media file within this category is guaranteed to be viewable/playable by at least half of all onboard passengers at the same time. The 25% tier indicates that any media file within this category is guaranteed to be viewable by at least a quarter of all onboard passengers at the same time. This media file categorization or media tier concept, enables system 100 to increase the overall media library size without having to increase the physical storage capacity of the smart monitors or upgrading the processor capability of the smart monitors. It is noteworthy that the adaptive aspects of the present disclosure are not limited to 100%, 50% and 25% categories, and instead other categories may be used.

Figure 2C:
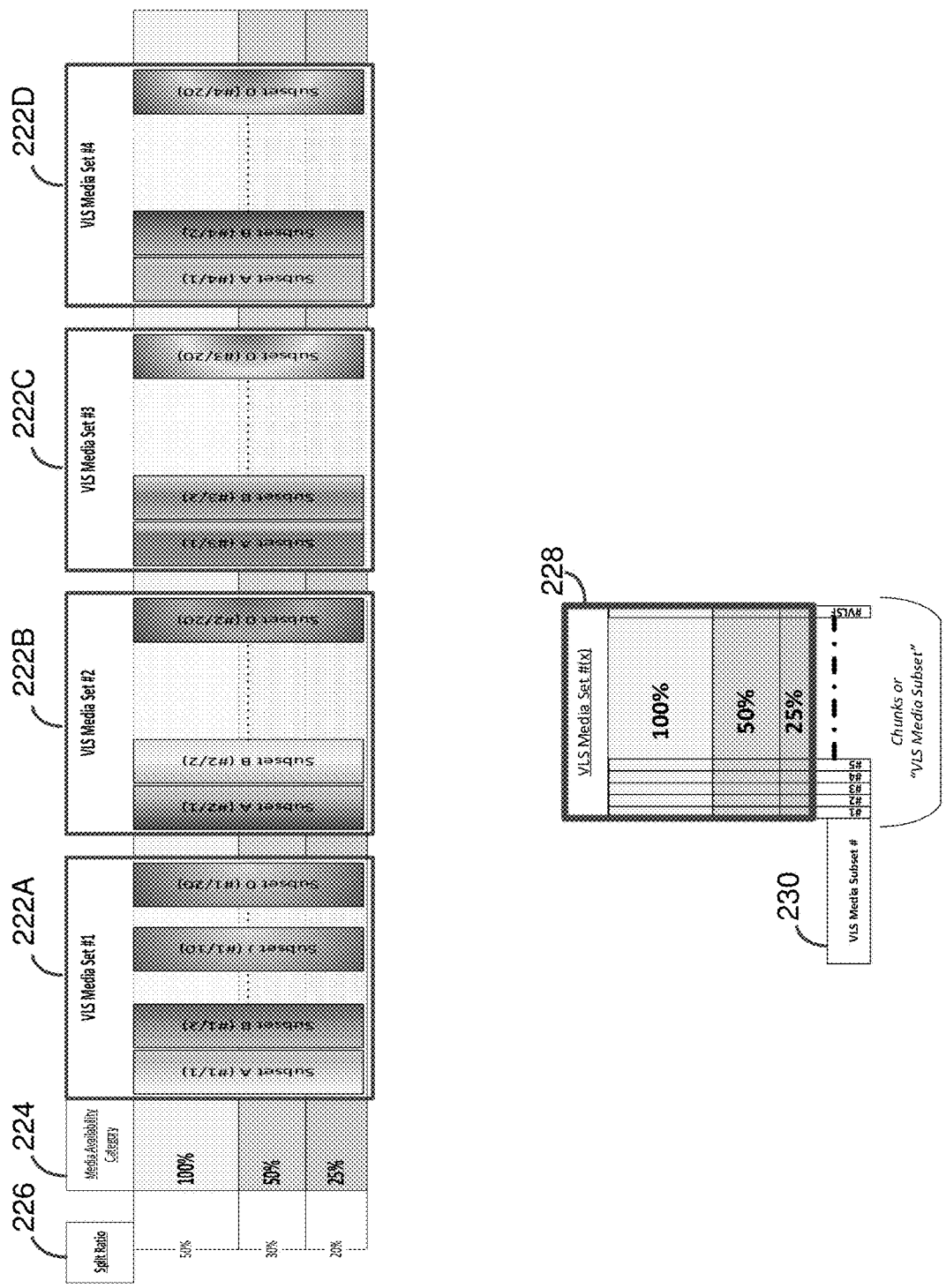
FIG. 2C shows an example of a plurality of VLS media sets configured according to one aspect of the present disclosure.

FIG. 2C shows an example of configuring the VLS media sets for storing a media library on an aircraft. In one aspect, the VLS configuration module 218 creates four VLS media sets 222A-222D to store media files based on media availability categories defined in column 224. The amount of storage for each category is defined by a split ratio 226. For example, an airline may define that 50% of the total, physical storage capacity should be used to store media files for the 100% category, 30% of the storage capacity should be used for storing media files for the 50% category and 20% of the storage capacity should be used to store media files for the 25% category (i.e. split ratio=50/30/20). While the number of media tiers is fixed as well as the specific guaranteed AVOD coverage of each media tier, the split ratio is customizable for different airlines.

In one aspect, in order to achieve the guaranteed AVOD coverage of 100%, 50% and 25%, the VLS Configuration Tool 214 creates four (4) different VLS Media Sets. The media files of the VLS Library are spread across the four (4) VLS Media Sets based on the desired AVOD coverage for each media file. Each VLS Media Set is divided into individual VLS Media Subsets. The number of VLS Media Subsets is based on the chosen VLSF for a given aircraft configuration. Each VLS Media Subset is comprised of media titles that belong to one of three media tiers. The VLS Configuration Tool 214 assigns each smart monitor 132 a specific VLS Media Subset. For example, in a three (3) media tier configuration, if the VLSF is twenty (20), then the distinct number of VLS Media Subsets is four (4) times twenty (20), or eighty (80) VLS Media Subsets.

Figure 2D:
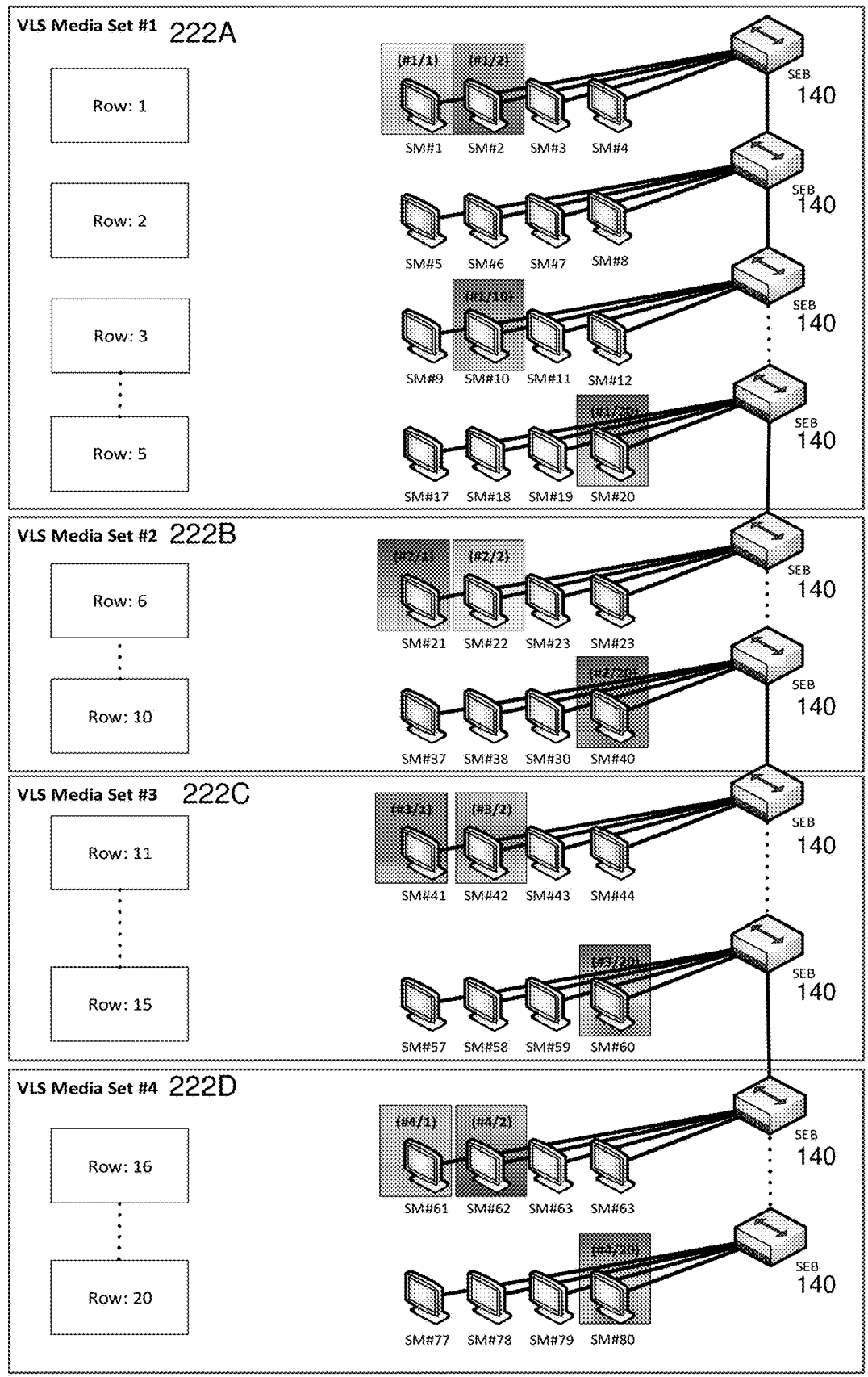
FIG. 2D shows an example of distributing media across a plurality of smart monitors, according to one aspect of the present disclosure.

FIG. 2D shows an example of storing a VLS media library on an aircraft. In this example, the aircraft may have 240 seats and a VLSF factor of twenty (20) is used to distribute the media files across a plurality of smart monitors. The example of FIG. 2D shows that eighty (80) seats are required in order to store all media files that comprise the VLS Media Library. The first VLS Media Set 222A is distributed across the twenty (20) smart monitors of rows 1-5. The second VLS Media Set 222B is stored across the twenty (20) smart monitors in rows 6-10. The third VLS Media Set 222C is distributed across the twenty (20) smart monitors of rows 11-15, while the fourth VLS Media Set 222D is stored across the twenty smart monitors in rows 16-20. If the aircraft has 240 seats, the entire VLS Media Library is replicated three (3) times as each of the four media sets are replicated three (3) times.

Assume that a media file (for example, a movie title) is 20 GB and the physical storage at a smart monitor is 100 GB. In a conventional setting, with a VLSF of twenty (20) only a hundred (100) movie titles can be stored on the smart monitors. However, by using a split ratio of 50/30/20, fifty (50) movies can be stored for the 100% category, sixty (60) movies for the 50% category and eighty (80) movies for the 25% category. Hence, the total number of movies for the media library increases from 100 to 190. This effectively increases the VLS storage to 3.8 TB in a three media tier configuration (100%/50%/25%) compared to 2 TB in a single media tier configuration where any movie is available to all passengers at the same time (100% only category). If a split ratio of 30/30/40 is used, then thirty (30) movies are stored for the 100% category, sixty (60) movies are stored for the 50% category and 160 movies are stored for the 25% category. This increases the number of movie titles from 100 to 250, and hence the VLS Media Library size for this configuration is effectively five (5) TB with a total of 250 movies titles.

It is noteworthy that the foregoing example is provided to illustrate how the media library size can be increased by categorizing the movie titles without changing the smart monitor storage capacity or processor capabilities. The adaptive aspects disclosed herein are not limited to any specific split ratio or category type.

Figure 3A:
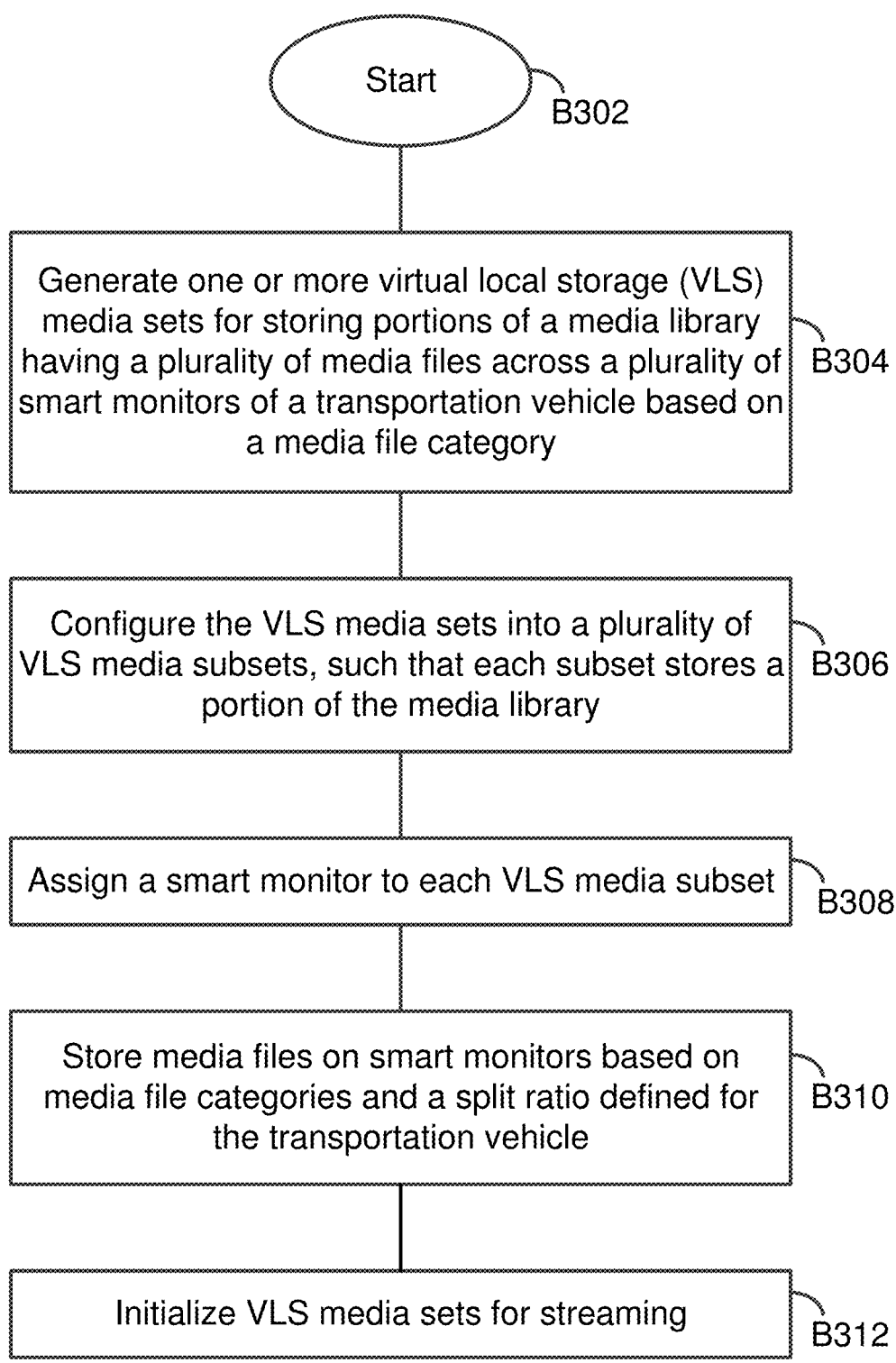
FIG. 3A shows a process flow for configuring VLS media sets, according to one aspect of the present disclosure.

Process 300:

FIG. 3A shows a process flow 300 for configuring one or more VLS media sets for a passenger transportation vehicle, according to one aspect of the present disclosure. The various process blocks of process 300 are executed by program logic of a computing device that executes the VLS configuration tool 214, described above with respect to FIG. 2B. The examples below are described with respect to an aircraft but are equally applicable to any type of transportation vehicle.

Process 300 begins in block B302, after a plurality of media tiers or guaranteed AVOD Coverage categories, C1/C2/C3 for storing media files have been determined. As an example, C1 may be 100%, C2 may be 50% and C3 may be 25% category, as described above. A split ratio, i.e., S1/S2/S3 for the VLS is received from an entity that operates the transportation vehicle, e.g., an airline for an aircraft. For example, S1/S2/S3 may be 50/30/20, i.e., 50% of the available physical storage capacity of smart monitors is allocated to the 100% category, 30% of the available physical storage capacity of smart monitors is allocated to the 50% category and 20% of the available physical storage capacity of smart monitors is allocated for the 25% category. The VLSF for the transportation vehicle is also obtained. In one aspect, the VLSF depends on the smart monitor processor capabilities and a smart monitor's ability to stream media files to other smart monitors and the available network bandwidth.

Based on the foregoing, in block B304, a plurality of VLS media sets are generated. The number of VLS Media Sets to host the entire VLS Media Library depends on the number of categories for storing media files. For example, to accommodate 100/50/25 percent categories, four VLS media sets are required, as shown in FIG. 2C and described above. Each VLS media set 222A-222D is configured with a plurality of VLS media subsets (e.g., 230). An example of the VLS media subsets is also shown in FIG. 2C. The number of VLS media subset is a function of the VLSF. For example, if the VLSF is twenty (20), then each of the four VLS media sets is configured with twenty (20) VLS media subsets.

A VLS Media Subset is assigned to one or more smart monitors in block B308. In block B310, each VLS Media Subset is comprised of the media files from the different categories and stored on the smart monitors. For example, in order to achieve the required guaranteed AVOD coverage, a media file that is identified to belong to the 100% category is present in each of the four (4) VLS media set. A media file in the 50% category is stored in two (2) out of the four (4) VLS media sets, while a media file in the 25% category is stored in just one (1) of the four (4) VLS media sets. This enables the system to expand the overall VLS media library size without increasing the storage capacity at the smart monitors or the processor ability by storing a greater number of media files that have various levels of guaranteed AVOD coverage, compared to a system where every media file is available to all the passengers at the same time. Thereafter, in block B312, the VLS media sets are initialized and the media library is ready for use by the passengers.

Figure 3B:
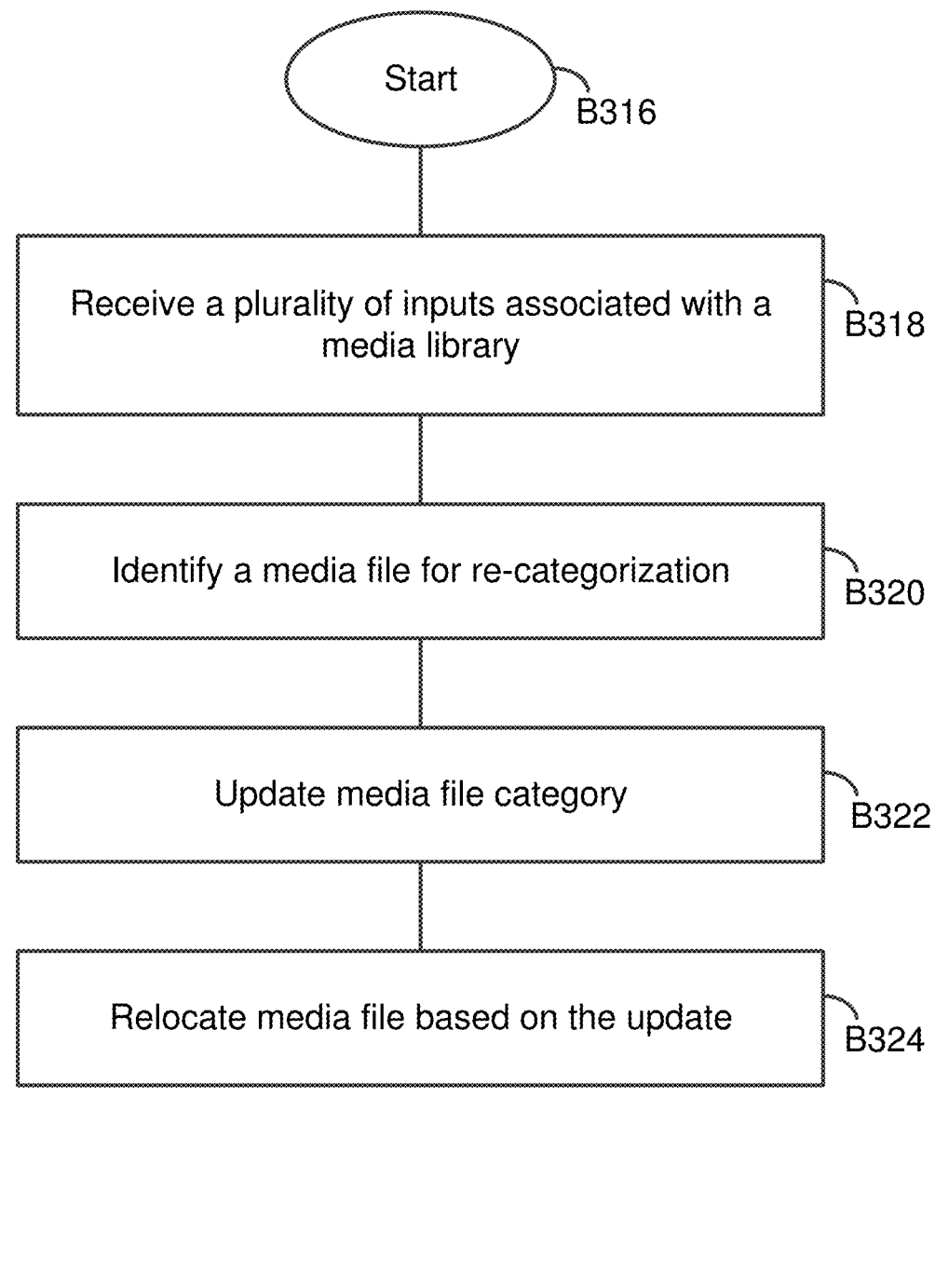
FIG. 3B shows a process flow for managing media files on a transportation vehicle, according to one aspect of the present disclosure.

Process 314:

FIG. 3B shows a process 314 for modifying a category of media files of a media library of an IFE system, according to one aspect of the present disclosure. The process blocks of FIG. 3B are executed by the media selector module 218 that may be executed by a computing device. In one aspect, when a media file is initially uploaded to a smart monitor, it may be placed in the "100%" category, i.e., it is made available for viewing by 100% of the passengers simultaneously. However, it may be necessary to promote or demote media files from one to another category. When promoting media files, the system has to push the specific file to more smart monitors in order to meet the required AVOD coverage percentile for the specific category. When demoting a title, the system needs to remove some of the copies in the cabin smart monitor network as the required AVOD coverage for the specific filed decreased.

Process 314 begins in block B316 when media files have been stored using the VLS media sets described above. In block B318, the media selector 218 receives a plurality of inputs 220A-220N [(see FIG. 2B). For example, the plurality of inputs may include data from an aircraft identifying how often a specific media file was accessed simultaneously and viewed in parallel by airline passengers, whether the passengers were in premium or economy class; airline preference, route information, aircraft type and configuration, flight time and season, third party media title ratings (for example, Rotten Tomato or IMDB ratings (without derogation of any third party trademark rights) and current category assigned to the media files.

In block B320, the media selector 218 executing instructions identifies any media file that needs to be re-categorized. In one aspect, the media selector 218 assigns a weight to each input 220A-220N and determines a score for each media file. The weighted score is compared to a threshold value to identify that a media file needs to be re-categorized. In block B322, the category for the media file is updated and the media file is re-located to a different media category/tier in block B324 using the four (4) VLS media sets described above.

Figure 3C:
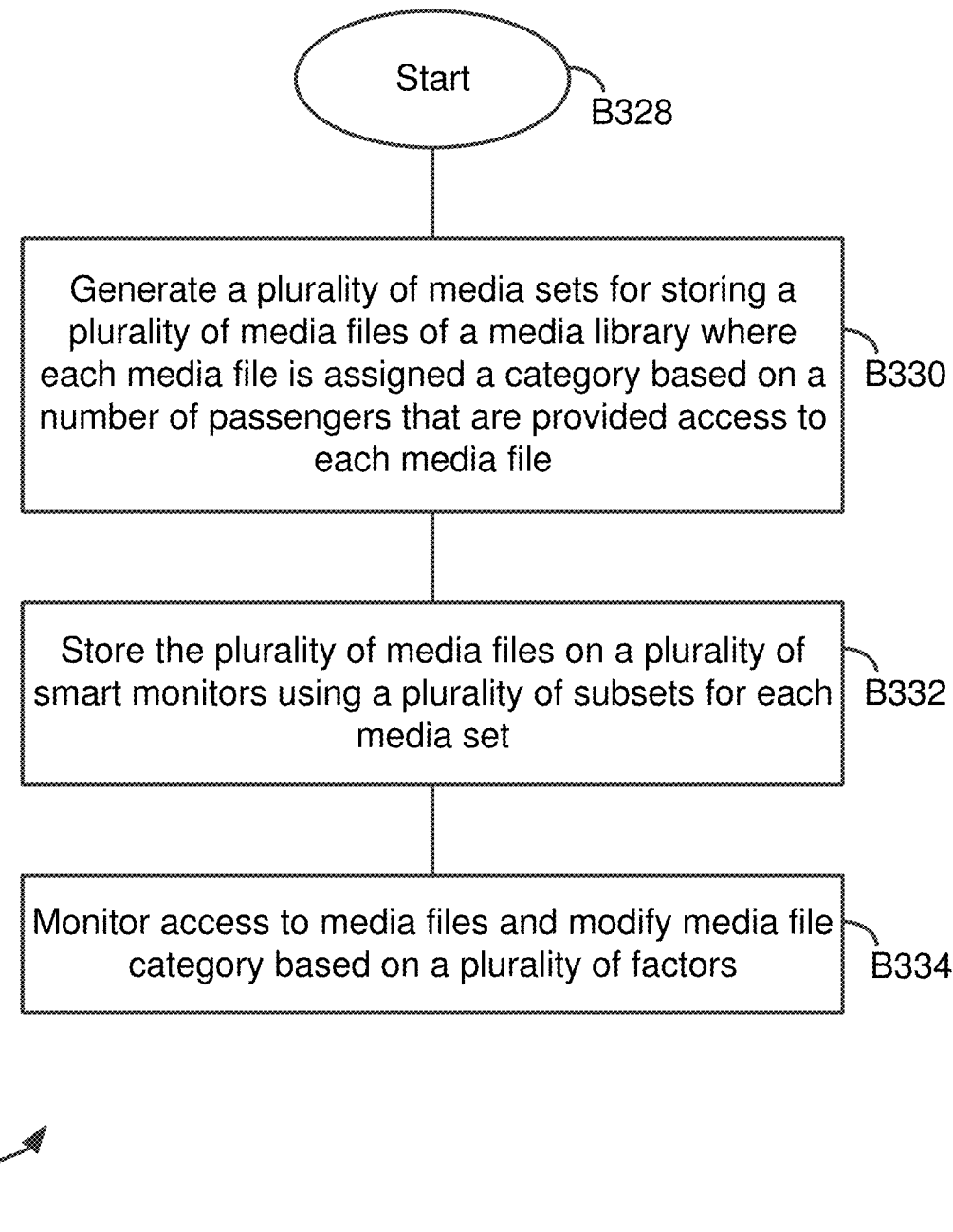
FIG. 3C shows a process flow for configuring a media library, according to one aspect of the present disclosure.

Process 326:

FIG. 3C shows another process 326 for a transportation vehicle, according to one aspect of the present disclosure. The process begins in block B328, when the airline identifies the split ratio of the three (3) media tiers to be used in conjunction with the four (4) VLS Media Sets, for example, 50/30/20. The media availability category has been determined, for example, 100%, 50% and 25%. In one aspect, the process blocks of FIG. 3C are executed by the VLS configuration tool 214.

In block B330, a plurality of media sets (e.g. 222A-222D, FIG. 2C) are generated to store the media files of a media library. Each media file is assigned to a category, based on the preference in regards to the percentile of passengers that are guaranteed to be able to access the media file simultaneously. If a passenger attempts to access a media file in a category other than 100%, and the number of passengers that are simultaneously trying to access a specific title exceeds the guaranteed AVOD coverage value, then a message may be displayed informing the passenger that the title is currently unavailable and to try again later. Moreover, this may be used as a trigger for promotion of media file to a tier having a greater percentage of availability. Alternatively, the passenger may be given the option to receive a notification when the media file becomes available.

In block B332, the media files are stored across smart monitors. Each media set has a certain number of media subsets (e.g. 230, FIG. 2C) based on a VLSF. An example of storing the various media sets is shown in FIG. 2D and described above.

In block B334, access to the various media files is monitored. The access may be monitored by program logic of each smart monitor and provided to the server 134. The access pattern is then provided to the media selector 218. A media file category is modified by the media selector module 218 based on a plurality of factors, e.g., data identifying how often a media file was accessed by users, whether the users were in premium class or economy; the duration of a journey, route information, transportation vehicle type and configuration, season when a journey is taking place, third party ratings for the media files (for example, Rotten Tomato and/or IMDB ratings (without derogation of any third party trademark rights), current category assignment of each media file, and/or the number of requests for access to a media file that could not be immediately fulfilled due to too many passengers accessing the media file.

It is noteworthy that the media selector 218 executes a machine learning process based on which the media file category is updated. This may be implemented as a neural network. Alternatively, other methods may be used to update media file categories.

Figure 3D:
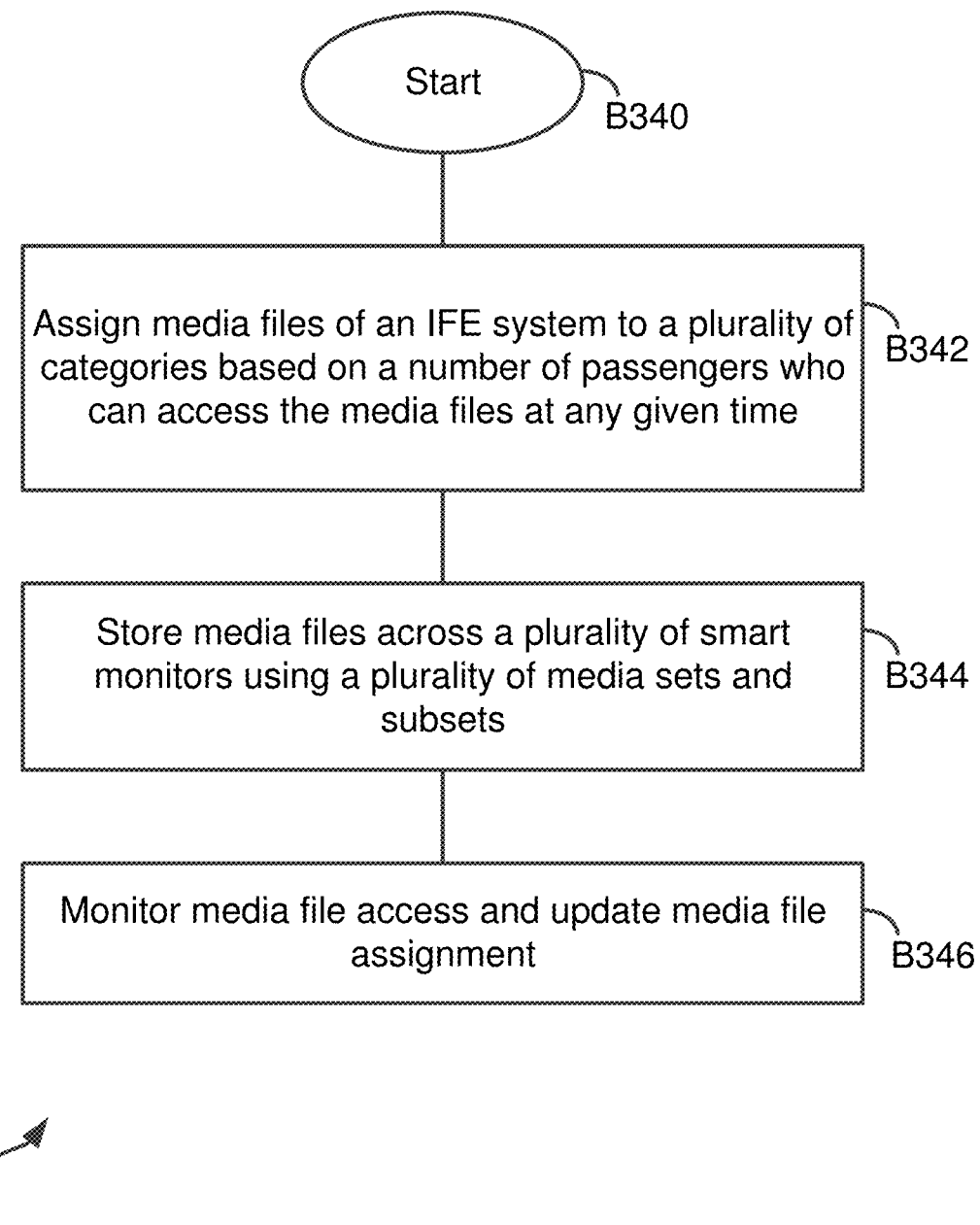
FIG. 3D shows a process flow for configuring media files on an aircraft, according to one aspect of the present disclosure.

Process 338:

FIG. 3D shows a process 338, according to yet another aspect of the present disclosure. Process 338 begins in block B340, when a split ratio from an airline or aircraft has been received, for example, 50/30/20. The media availability category has been determined, for example, 100%, 50% and 25%. In one aspect, the process blocks of FIG. 3C are executed by the VLS configuration tool 214.

In block B342, the media files of a media library of an IFE system are assigned a specific category, for example, 100%/50%/30%. The overall storage space for the media files at the smart monitors is based on the split ratio provided by an airline, for example, 50/30/20, as shown in FIG. 2C and described above.

In block B344, a plurality of media sets having a plurality of media subsets are used to store the media files on the smart monitors. An example of this is shown in FIG. 2D, described above in detail. Thereafter, in block B346, access to media files is monitored. A media file category is modified by the media selector module 218 based on a plurality of factors, e.g. data identifying how often a media file was accessed by users, whether the users were in premium class or economy; the duration of a flight, flight route information, aircraft type and configuration, season when a taking place, third party ratings for the media files (for example, Rotten Tomato and/or IMDB ratings (without derogation of any third party trademark rights) and current category assignment of each media file.

In one aspect methods and systems for a vehicle entertainment system are provided. One method includes generating by a processor, a plurality of media sets of a media library for storing a plurality of media files at a transportation vehicle, each of the plurality of media sets configured to store a first set of media files that can be played by all passengers at the same time, a second set of media files can be played by up to X percentage of the passengers at the same time, and a third set of media files that can be played by Y percentage of the passengers at the same time; distributing by the processor, the plurality of media files for storage across a plurality of smart monitors of the transportation vehicle; monitoring user access of the plurality of media files on the transportation vehicle; and modifying by the processor, an assignment of a media file between the first set, the second set and the third set based on a plurality of factors.

In another aspect, a method for an aircraft is provided. The method includes assigning by a processor, a first portion of a media library having a plurality of media files for an inflight entertainment system of an aircraft to a first set of media files in which each media file of the first set can be played at the same by all passengers of the transportation vehicle, and a second portion to a second set of media files in which each media file of the second set can be played at the same time by up to X percentage of the passengers; and storing by the processor, the plurality of media files for storage across a plurality of smart monitors of the aircraft using the media sets. The plurality of media files are streamed from the plurality of smart monitors in response to user requests. The method further includes monitoring access to the plurality of media files based on user requests; and modifying by the processor, an assignment of a media file between the first set and the second set based on a plurality of factors including at least two of an access pattern of the media file, aircraft route information, airline preference, aircraft type and configuration, a third party rating of the media file, time of the year and an airline preference.

Figure 4:
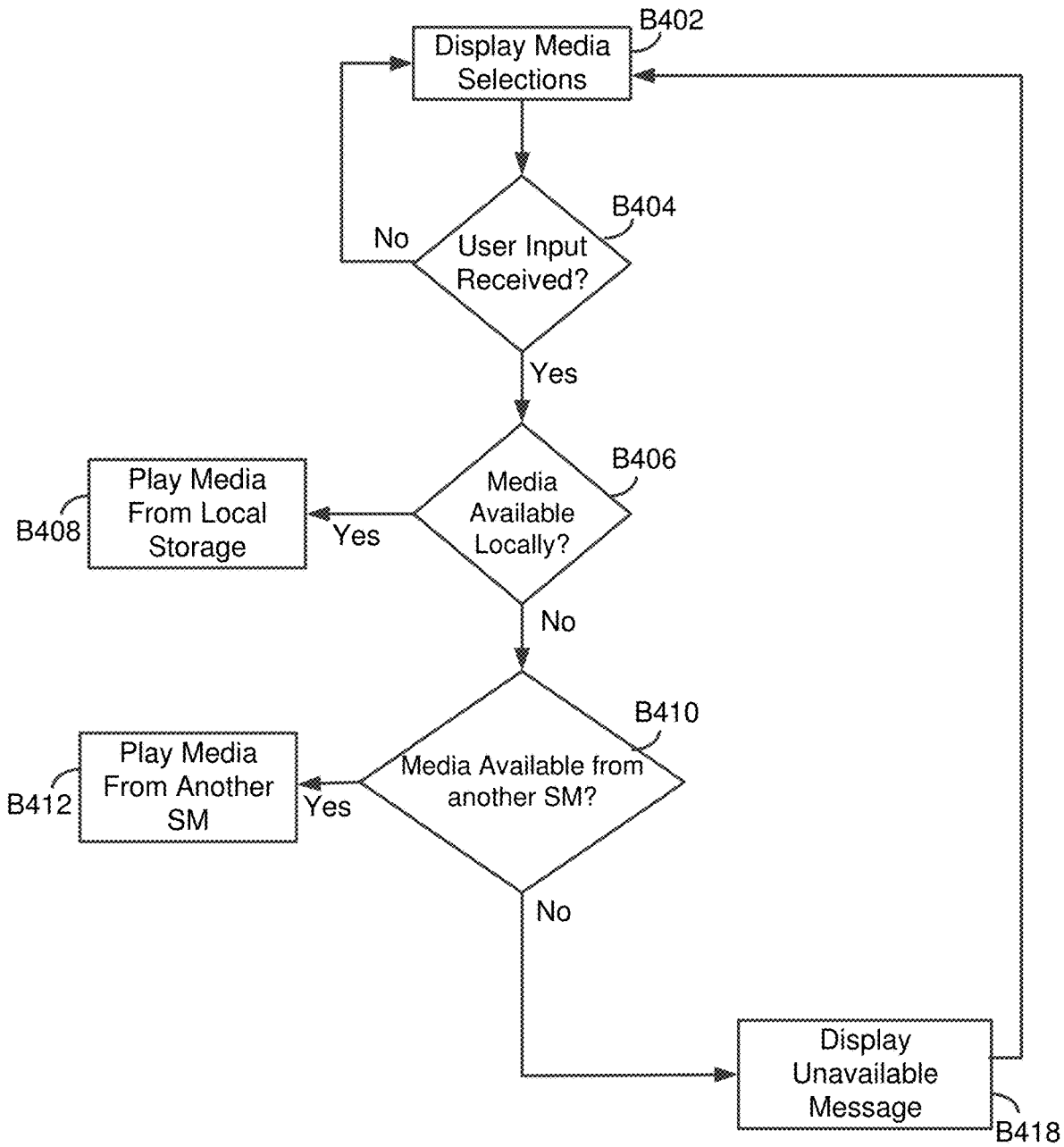
FIG. 4 is a flow chart of example software or program logic executed by the smart monitors of FIG. 2D in responding to an input for a media request from a user or passenger, according to one aspect of the present disclosure.

Process 400:

FIG. 4 shows a process 400 for streaming media from smart monitors using the configured VLS media sets, according to one aspect of the present disclosure. As mentioned above, each smart monitor 132 includes software or program logic to display media selections as indicated in process box B402 of the flow chart. In this state, the program logic waits for an input from a user or passenger to choose one of the media selections as indicated in decision box B404. The logic initially checks in decision block B406 to determine if a media file corresponding to the selection is available from a first source. The sources include local content storage of the smart monitor 132 or another smart monitor 132 or an AVOD capable streamer server on the head-end server.

In one aspect, the first source is the media file stored locally in the smart monitor's 132 non-volatile memory, i.e., local content storage such as a memory card. If so, the logic plays the media file from the first source, i.e., from local content storage as shown in process block B408 of the example program logic illustrated in FIG. 4. Playing media from local content storage has the advantage of minimizing network traffic and generally does not require buffering of the stream. Access to the media file is noted by the program logic of the smart monitor. This information is provided to the media selector 218 as an input.

If a media file corresponding to the media file selection is not available from the first source, i.e., in local content storage for this aspect, the program logic proceeds to decision block B410. The program logic in decision block B410 determines whether a media file corresponding to the selection is available from an alternative source. In this aspect, the alternative source is another smart monitor 132 accessible via the cabin network. That is, if a media file corresponding to the selection from the user/passenger is not available in local content storage, the smart monitor program logic searches or looks for the media on other smart monitors 132. If the media file is available from another smart monitor, the media file is streamed therefrom and played as indicated in process block B412. This information is provided to the media selector 218 as an input.

The search for a content providing resource is cabin wide and includes all smart monitors. Smart search algorithms may be employed to reduce the network traffic when looking for a content providing resource, such as another smart monitor that is close to requesting smart monitor. If the file is not available, an unavailable indication is provided to the user or passenger, such as by displaying a message as indicated by process block B418. Thereafter, the logic returns to displaying media selections in process block B402 to wait for another input, or different passenger selection.

Once streaming has begun from one smart monitor 132 to another, the smart monitor 132 receiving the stream includes program logic that monitors for acceptable packet loss. If the packet loss is determined to be in excess of an acceptable level, the program logic requests the media from another source, i.e., a different smart monitor 132.

The preference for whether a source is first, second, or later in priority for where a smart monitor looks for a media file may be read from a configuration file. The default configuration is for the smart monitor (SM) to first look for content in local storage, then to possibly source it from other SMs within the cabin (network) and last from an AVOD server on the head-end. The configuration information may be data pre-stored in the smart monitors 132 upon installation in the vehicle 102, a file downloaded from the server 134, or a simple message broadcast along the network 138.

Figure 5:
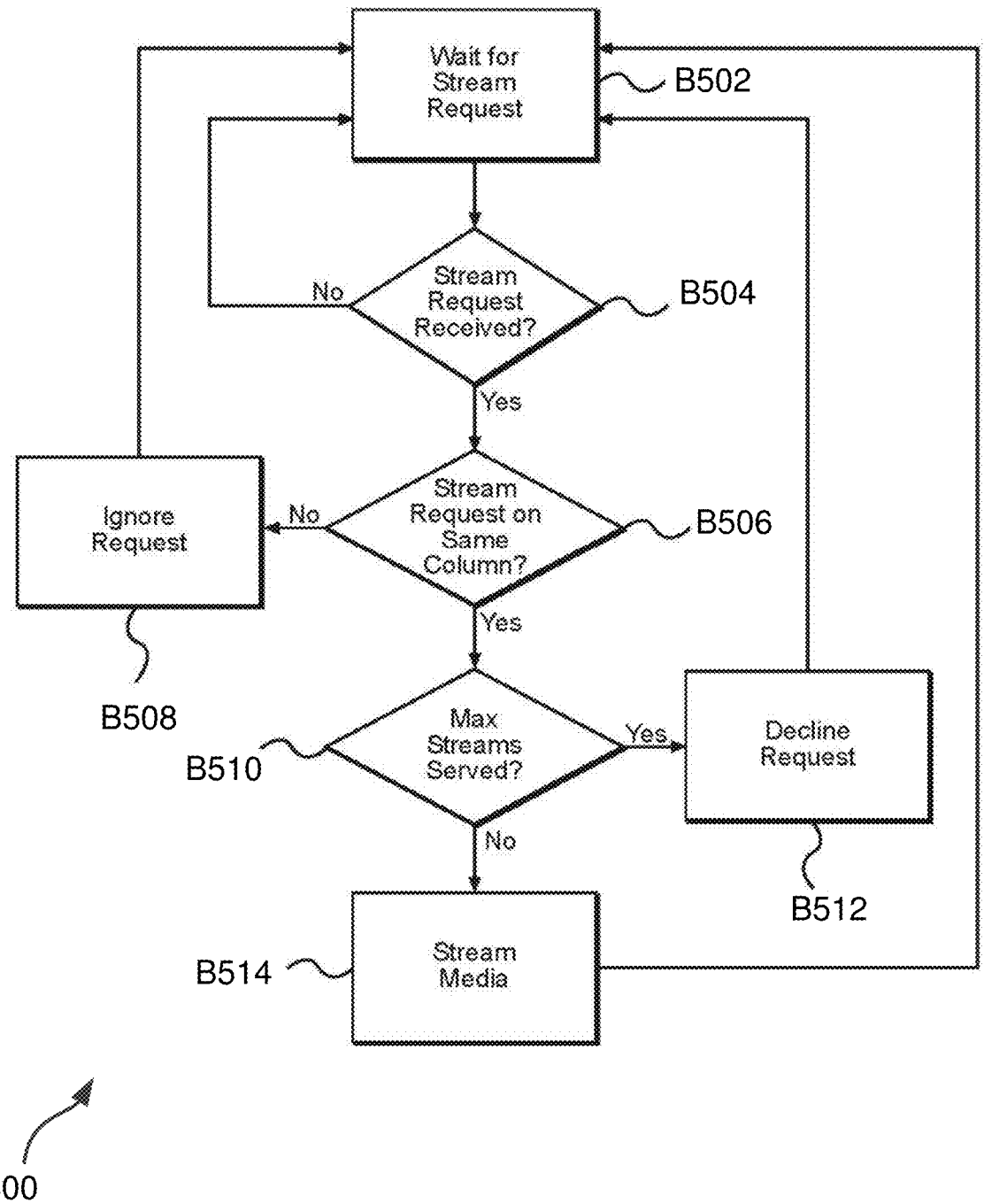
FIG. 5 is a flow chart of example software or program logic executed by the smart monitors of FIG. 2D in responding to a request from another smart monitor for streaming media, according to one aspect of the present disclosure.

Process 500:

FIG. 5 illustrates the program logic on each smart monitor for operating a local media server to execute a process indicated generally by reference numeral 500. In process block B502, the program logic waits or listens for a request to stream a media file over the network 136. If no stream request is received or detected in decision block B504, the logic continues monitoring for a stream request in process block B502.

In some aspects of the system 100 it may be desired to limit streaming from one smart monitor 132 to another, to only on the same column sub-network 138 if the network topology includes column sub-networks. If so, the logic proceeds to an optional decision block B506 that determines if the stream request is from a smart monitor 132 on the same column sub-network 138 as the smart monitor 132 that received the request. If it is not, the logic ignores the request as indicated in process block B510 and the logic returns to waiting or listening for a stream request in the initial process block B502. However, the disclosure is not limited to any specific network topology and other types by used, such as star or ring, by way of non-limiting illustrative examples.

If streaming is permitted from a smart monitor 132 on one column sub-network 138 to a smart monitor 138 on another column sub-network 138, this optional decision block B506 is not necessary. In this situation, or if the request is from a smart monitor 132 on the same column sub-network 138 in the case of the optional decision block B506, the logic inquires whether the maximum quantity of streams is being served in decision block B510.

If the maximum quantity of streams is being served, the request is declined or ignored as indicated in process block B512. Otherwise the media file corresponding to the request is streamed as indicated in process block B514. After accepting the request and streaming the media or declining the request, the logic returns to its default state in process block B502 of monitoring for a stream request. In addition, for some aspects, the logic may prioritize requests from smart monitors 132 in premium class seating. For example, the logic may accept up to one less than the maximum quantity of streams possible to serve, except for requests from smart monitors 132 in premium class. In this way, a reserve would be established for users or passengers in premium class for popular media files.

The 100% category or tier is for media files in which each media file in this category/tier is playable by all passengers at the same time. That is, the media file is stored in local memory of a sufficient quantity of smart monitors 132 that all of the passengers aboard the vehicle could select the same media file in that category and play it with suitable quality. However, with the exception of safety videos, it is rare for any media file to be played by all passengers at the same time. Hence, a system with media files for entertainment may be provided with no media files in the 100% category.

For example, categories of 50% and 25% may be provided. In this system, media files in the 50% category are stored in local content of a sufficient quantity of smart monitors to only enable a media file in this category to be viewed by up to one half of the passengers at the same time. A media file in the 25% category may be viewed by only one fourth of the passengers at the same time. Providing categories of only 50% and 25% may be satisfactory in some situations and enables expansion of the media library further.

The present disclosure therefore includes a system for providing entertainment on a vehicle for passengers. The system includes smart monitors disposed in the vehicle with each smart monitor including local content storage storing media files in which each smart monitors is configured to present media selections to passengers corresponding to the media files stored collectively by all the smart monitors. The system includes a network connecting the smart monitors and program logic executed by each smart monitor.

The program logic, after a smart monitor receives an input from a passenger for one of the selections, performs tasks including determining if a media file corresponding to the passenger's input is available from local content storage of the smart monitor, and if available, playing the media file from the local content storage of the smart monitor. If the media file corresponding to the passenger's input is not available from the local content storage of the smart monitor, determining if a media file corresponding to the input is available from another smart monitor and if available, playing the media file from the another smart monitor. In this system, media files predicted to be selected less frequently by the passengers, are stored in local content storage of a fewer quantity of the smart monitors than the other media files. Alternatively stated, media files predicted to be selected more frequently, appear with greater frequency among the media files distributed across the smart monitors in the vehicle cabin, i.e., a greater quantity of the smart monitors include in local content storage thereof media files predicted to be selected with greater frequency relative to other media files.

Figure 6:
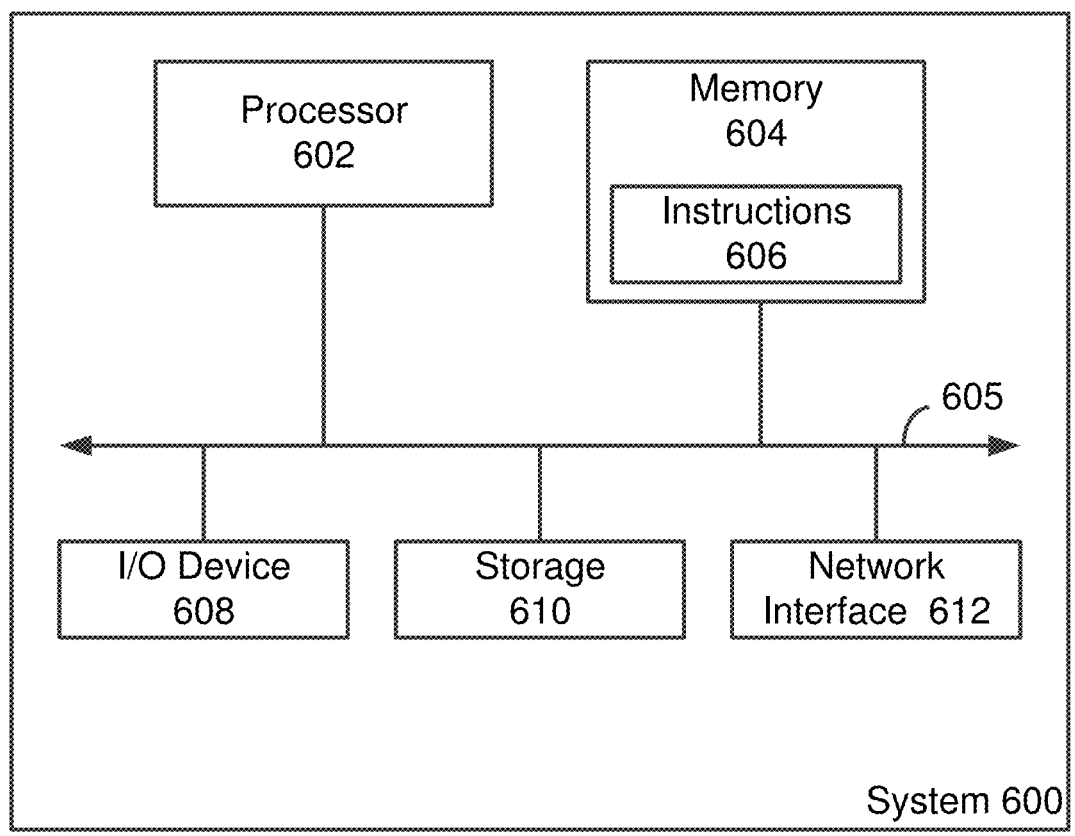
FIG. 6 shows a block diagram of a computing system, according to one aspect of the present disclosure.

Processing System:

FIG. 6 is a high-level block diagram showing an example of the architecture of a processing system 600 that may be used according to one aspect. The processing system 600 can represent server 134 or a computing device executing VLS configuration tool 214. Note that certain standard and well-known components which are not germane to the present aspects are not shown in FIG. 6.

The processing system 600 includes one or more processor(s) 602 and memory 604, coupled to a bus system 605. The bus system 605 shown in FIG. 6 is an abstraction that represents any one or more separate physical buses and/or point-to-point connections, connected by appropriate bridges, adapters and/or controllers. The bus system 605, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 602 are the central processing units (CPUs) of the processing system 600 and, thus, control its overall operation. In certain aspects, the processors 602 accomplish this by executing software instructions stored in memory 604. A processor 602 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 604 represents any form of random access memory (RAM), read-only memory (ROM), flash memory, or the like, or a combination of such devices. Memory 604 includes the main memory of the processing system 600. Instructions 606 may be used to implement the process steps of FIGS. 3-5 described above.

Also connected to the processors 602 through the bus system 605 are one or more internal mass storage devices 610, and a network interface 612. Internal mass storage devices 610 may be, or may include any conventional medium for storing large volumes of data in a non-volatile manner, such as one or more magnetic, optical, or semiconductor based disks.

The network interface 612 provides the processing system 600 with the ability to communicate with remote devices (e.g., over a network) and may be, for example, an Ethernet adapter or the like.

The processing system 600 also includes one or more input/output (I/O) devices 608 coupled to the bus system 606. The I/O devices 608 may include, for example, a display device, a keyboard, a mouse, etc.

Figure 7:
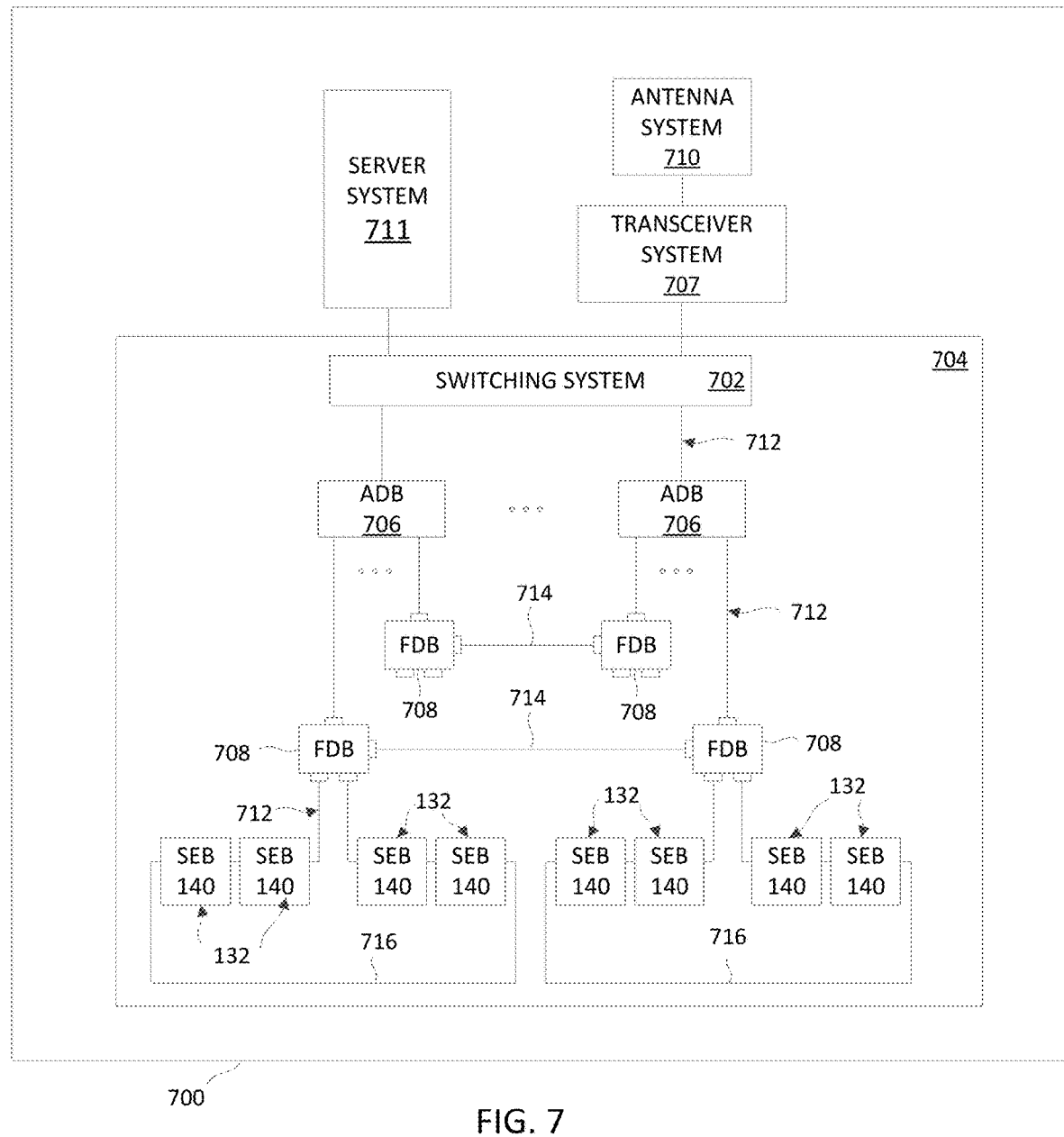
FIG. 7 is a block diagram of an example of a content distribution system for a vehicle.

FIG. 7 illustrates an example of a content distribution system 704 for a vehicle 700 for commercial mass passenger transport, such as an aircraft, ship, train, bus, ferry other vehicle. The content distribution system 704 couples, and supports communication between a content server system 711, and a plurality of smart monitors 132. The content server system 711 may be referred to simply as a content server.

The content distribution system 704, for example, can be provided as a conventional wired and/or wireless communication network, as previously described. The distribution system 704 can be provided as a plurality of area distribution boxes (ADBs) 706, a plurality of floor disconnect boxes (FDBs) 708, and a plurality of seat boxes (SEBs) 140 as described earlier, and configured to communicate in real time via a plurality of wired and/or wireless communication connections 712. The distribution system 704 includes a switching system 702 for providing an interface between the distribution system 704 and the server system 711. The switching system 702 can comprise a conventional switching system, such as an Ethernet switching system, and is configured to couple the server system 711 with the area distribution boxes 706. Each of the area distribution boxes 706 is coupled with, and communicates with, the switching system 702. The switching system 702 is frequently referred to as a network controller. On some vehicles, for example, narrow body aircraft, the switching system 702 may integrate the content server system 711, which is typically referred to as an integrated server system, or simply integrated server.

Each of the area distribution boxes 702, is coupled with, and communicates with, at least one floor disconnect box 708. Although the area distribution boxes 706 and the associated floor disconnect boxes 708 can be coupled in any conventional configuration, the associated floor disconnect boxes 708 preferably are disposed in a star network topology about a central area distribution box 706. Each floor disconnect box 708 is coupled with, and services, a plurality of daisy-chains of seat boxes 140. The seat electronics boxes 140, in turn, are configured to communicate with the smart monitors 132. Each seat box 140 can support one or more of the smart monitors 132.

The distribution system 704 can include at least one FDB internal port bypass connection 714 and/or at least one SEB loopback connection 716. Each FDB internal port bypass connection 714 is a communication connection 712 that permits floor disconnect boxes 708 associated with different area distribution boxes 706 to directly communicate. Each SEB loopback connection 716 is a communication connection 712 that directly couples the last seat electronics box 140 in each daisy-chain of seat electronics boxes 140 for a selected floor disconnect box 708. Each SEB loopback connection 716 therefore forms a loopback path among the daisy-chained seat boxes 140 coupled with the relevant floor disconnect box 708.

The content distribution system 704 includes an antenna system 710 and transceiver system 707 for communication with a source external to the vehicle, for example, a ground station or satellite, for providing an Internet connection. The switching system 702, the area distribution boxes 706, the floor disconnect boxes 708, the seat boxes 140, the antenna system 710, the transceiver system 707, the server system 712, and other system resources are provided as line replaceable units, hereinafter referred to as "LRUs." The use of LRUs facilitate maintenance of the vehicle information system because a defective LRU can simply be removed and replaced with a new (or different) LRU. The defective LRU thereafter can be repaired for subsequent installation. Advantageously, the use of LRUs can promote flexibility in configuring the content distribution system 704 by permitting ready modification of the number, arrangement, and/or configuration of the system resources of the content distribution system 704. The content distribution system 704 likewise can be readily upgraded by replacing any obsolete LRUs with new LRUs.

In the content distribution system 704, the smart monitors 132 have content (media files) stored thereon as previously described in local content storage thereof. In particular, the system 704 includes smart monitors 132 disposed in the vehicle with each smart monitor including local content storage storing media files in which each smart monitors is configured to present media selections to passengers corresponding to the media files stored collectively together by the smart monitors. The system 704 includes a network connecting the smart monitors 132 in communication and program logic executed by each smart monitor.

The program logic, after a smart monitor receives an input from a passenger for one of the selections, performs tasks including determining if a media file corresponding to the passenger's input is available from local content storage of the smart monitor, and if available, playing the media file from the local content storage of the smart monitor 132. If the media file corresponding to the passenger's input is not available from the local content storage of the smart monitor, the logic determines if a media file corresponding to the selection is available from another smart monitor and if available, playing the media file from the another smart monitor.

In system 100, when selecting another smart monitor 132 from which to stream the media file, the logic selects first another smart monitor connected to the same column, either 104 or 106 (see FIG. 1A). In system 704 (see FIG. 7), the logic selects first another smart monitor connecting to the same floor distribution box 708, and if not available next a monitor connecting to the same ADB 706. In a system having multiple switching systems 702, the next preference is a smart monitor that is in communication with the same switching system. If there are multiple choices available meeting the foregoing criteria, the smart monitor 132 selected is the one having the least number of active clients. This minimizes the distance travelled for network traffic while minimizing stress on smart monitors. In a situation where a media file cannot be located on another smart monitor or there is no response to a request for the media file, the logic requests the media filed from the server system 711, sometimes referred to as a headend server.

Figure 8:
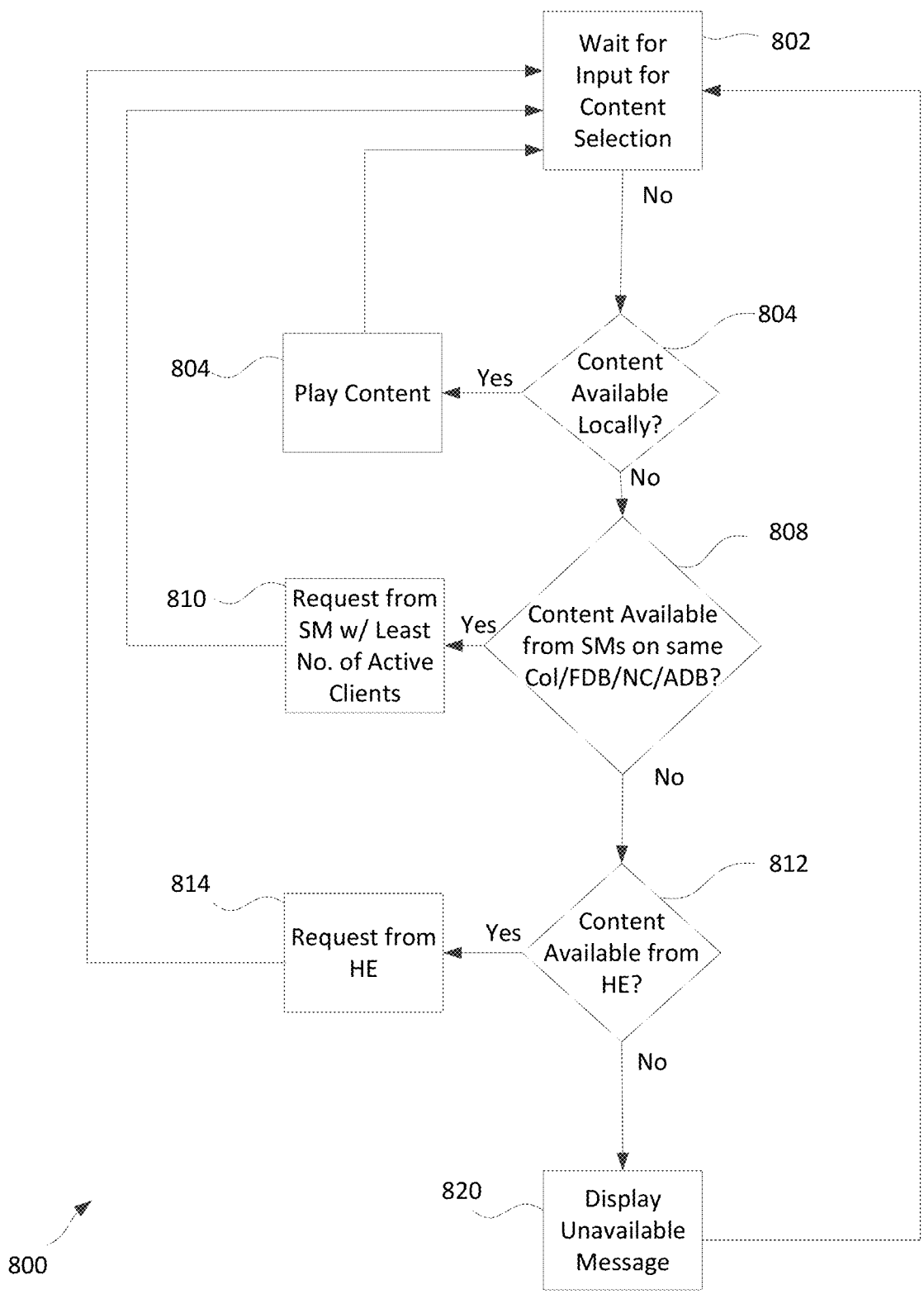
FIG. 8 is a flow chart of example software or program logic executed by a smart monitor in determining from which source to play a media file.

FIG. 8 illustrates a flow chart of the logic 800 for the foregoing selection process. After initiation, the logic 800 waits for an input from a passenger for a content selection in block 802. If an input is received for a content selection, the logic 800 determines in block 804 if a media file corresponding to the selection is available locally, i.e., in local content storage of that smart monitor 132. If yes, the logic 800 plays the content from local storage in block 806. Thereafter, the logic returns to block 802 to wait for another input for a content selection.

If a media file corresponding to the selected content is not available locally, the logic determines in block 808 if a media file corresponding to the selected content is available from other smart monitors 132. Preference is given first to smart monitors on the same column 104 or 106 (see FIG. 1), then to those connected to the same floor distribution box 708, then to those connected on the same area distribution box 706 (see FIG. 7), and if there are multiple switching systems 702, to those on the same switching system. If yes, the logic 800 requests streaming of the media file from the smart monitor 132 having the least number of active clients in block 810, and plays/renders the stream. Thereafter, the logic returns to block 802 to wait for another input corresponding to a content selection.

If there is no response to a request to stream a media file, and the system includes a headend server, the logic determines if the media file is available from the headend server. If yes, the logic 800 requests streaming of the streaming media file from the headend server in block 814 and plays/renders the stream. Thereafter, the logic 800 returns to block 802 to wait for another request corresponding to a content selection request.

If the logic determines that a media file corresponding to the input content selection request is not available from any other smart monitor 132, i.e., a media file is not stored on any smart monitor or the smart monitors having the media file stored thereon are each serving the maximum number of allowed clients and the media file is not available from a headend server, the logic proceeds to block 820. In block 820, the logic displays a message indicating the requested content is currently unavailable. It may also offer an option to receive a notification when the content becomes unavailable. Thereafter, the logic 800 returns to block 802 to wait for another input corresponding to a content selection request.

Innovative technology for a vehicular entertainment system has been described in the foregoing paragraphs. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method comprising:
generating a plurality of media sets of a media library for storing a plurality of media files on a transportation vehicle across a plurality of smart monitors of the transportation vehicle, each of the plurality of media sets configured to store a first set of media files in which each media file of the first set is playable simultaneously by all passengers from the plurality of smart monitors, a second set of media files in which each media file of the second set is playable simultaneously by up to X percentage of all passengers, and a third set of media files in which each media file of the third set is playable simultaneously by up to Y percentage of all passengers;
distributing the plurality of media files for storage across the plurality of smart monitors of the transportation vehicle;
wherein a number of media files stored at the plurality of smart monitors for each of the plurality of media sets are based on a smart monitor's ability to stream data to another smart monitor of the transportation vehicle as determined by each smart monitor's processing ability and network bandwidth available on the transportation vehicle to each smart monitor;
wherein the plurality of media files are streamed from the plurality of smart monitors in response to user requests for media titles;
monitoring user access of the plurality of media files on the transportation vehicle; and
modifying an assignment of a media file between the first set, the second set and the third set based on a comparison of a weighted score of the media file to a threshold value, the weighted score determined using a plurality of factors including a user access pattern for the media file determined from the monitoring and transportation vehicle configuration and a third party rating of the media file; wherein prior to modifying, the media file is initially assigned to the first set.

2. The method of claim 1, wherein X percentage is greater than Y percentage.

3. The method of claim 1, wherein said plurality of factors include usage data from a plurality of transportation vehicles indicating access patterns for the plurality of media files.

4. The method of claim 1, wherein a split ratio defines a pre-determined amount of storage space that is used at the plurality of smart monitors for each of the first set, the second set and the third set of media files.

5. The method of claim 1, wherein each media set is subdivided into media subsets based on a factor defined by a processing capability of each smart monitor of the plurality of smart monitors and a network bandwidth available to the plurality of smart monitors for streaming a media file or a portion thereof.

6. The method of claim 1, wherein a media file is placed into one of the three sets based on a likelihood of being accessed at a same time by a certain number of passengers.

7. The method of claim 1, wherein the plurality of factors further include at least one of, route information, transportation vehicle type, transportation vehicle operator preference, and time of the year.

8. A method comprising:
assigning a first portion of a media library having a plurality of media files for an inflight entertainment system of an aircraft to a first set of media files in which each media file of the first set is playable simultaneously by all passengers of the aircraft from a plurality of smart monitors of the aircraft, and a second portion to a second set of media files in which each media file of the second set is playable simultaneously by up to X percentage of the passengers;
storing the plurality of media files for storage across the plurality of smart monitors of the aircraft using at least the first set and the second set, each set having a plurality of media subsets; wherein a number of media subsets are based on each smart monitor's processing ability to stream data to another smart monitor and network bandwidth available to each smart monitor for streaming media files;
wherein the plurality of media files are streamed from the plurality of smart monitors in response to user requests for media;
monitoring access to the plurality of media files based on user requests; and
modifying an assignment of a media file between the first and the second set based on comparison of a weighted score of the media file to a threshold value, the weighted score determined using a plurality of factors including an access pattern of the media file from a plurality of aircraft determined by the monitoring, aircraft route information, airline preference, aircraft type and configuration, a third party rating of the media file, and an airline preference.

9. The method of claim 8, wherein a third portion of the media library is assigned to a third set of media files in which each media file of the first set is playable simultaneously by up to Y percentage of the passengers.

10. The method of claim 9, wherein X percentage is greater than Y percentage.

11. The method of claim 9, further comprising inputting usage data for the media files into a ground tool for modifying the assignment.

12. The method of claim 9, wherein a split ratio based on airline preference configures an amount of storage space of the smart monitors for the first set, the second set and the third set of media files.

13. The method of claim 8, wherein a number of media subsets for each of the first and the second set is based on a factor defined by at least one of a processing capability of the plurality of smart monitors and a network bandwidth available to the plurality of smart monitors for streaming a media file or a portion thereof.

14. The method of claim 8, wherein when a media file is first placed in the media library of the inflight entertainment system, it is assigned to one of the first and second set of media files based on a likelihood of being accessed at a same time by a certain number of passengers.

15. A non-transitory machine readable medium having stored thereon instructions comprising machine executable code which when executed by a machine, causes the machine to:

assign a first portion of a media library having a plurality of media files for an inflight entertainment system of an aircraft to a first set of media files playable simultaneously by all passengers of the aircraft from a plurality of smart monitors of the aircraft, and a second portion to a second set of media files playable simultaneously by up to X percentage of the passengers;

store the plurality of media files for storage across the plurality of smart monitors of the aircraft using at least the first set and the second set, each set having a plurality of media subsets;

wherein a number of media subsets are based on each smart monitor's processing ability to stream data to another smart monitor and network bandwidth available to each smart monitor for streaming media files;

wherein the plurality of media files are streamed from the plurality of smart monitors in response to user requests for media;

monitor access to the plurality of media files based on user requests; and modify an assignment of a media file between the first and the second set based on comparison of a weighted score of the media file to a threshold value, the weighted score determined using a plurality of factors including an access pattern of the media file from a plurality of aircraft determined by the monitoring, aircraft route information, airline preference, aircraft type and configuration, a third party rating of the media file, and an airline preference.

16. The non-transitory storage medium of claim 15, wherein a third portion of the media library is assigned to a third set of media files in which each media file of the third set is playable simultaneously by up to Y percentage of the passengers.

17. The non-transitory storage medium of claim 16, wherein usage data for each media file is communicated to a ground tool from the aircraft for modifying the assignment.

18. The non-transitory storage medium of claim 16, wherein the X percentage is at least twice that of the Y percentage.

19. The non-transitory storage medium of claim 16, wherein a split ratio based on airline preference configures an amount of storage space of the smart monitors for the first set, the second set and the third set of media files.

20. The non-transitory storage medium of claim 15, when a media file is first placed in the media library of the inflight entertainment system, it is assigned to one of the first and second set of media files based on a likelihood of being accessed at a same time by a certain number of passengers.

* * * * *